US012793612B2

(12) United States Patent
Kim et al.

(10) Patent No.: US 12,793,612 B2
(45) Date of Patent: Nov. 10, 2026

(54) DISPLAY DEVICE AND METHOD OF MANUFACTURING THE SAME

(71) Applicant: LG Display Co., Ltd., Seoul (KR)

(72) Inventors: Hyoung-Su Kim, Paju-si (KR); JoonYoung Heo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/962,274

(22) Filed: Nov. 27, 2024

(65) Prior Publication Data

US 2025/0201178 A1 Jun. 19, 2025

(30) Foreign Application Priority Data

Dec. 13, 2023 (KR) ........................ 10-2023-0180719
Sep. 13, 2024 (KR) ........................ 10-2024-0125273

(51) Int. Cl.
*G09G 3/32* (2016.01)
*G09G 3/3266* (2016.01)

(52) U.S. Cl.
CPC ............. *G09G 3/32* (2013.01); *G09G 3/3266* (2013.01); *G09G 2300/04* (2013.01); *G09G 2300/0426* (2013.01); *G09G 2310/0267* (2013.01)

(58) Field of Classification Search
CPC ........ G09G 3/30–3291; G09G 2300/00–0895; H10K 59/00–95
See application file for complete search history.

(56) References Cited

U.S. PATENT DOCUMENTS

| | | | | |
|---|---|---|---|---|
| 7,894,116 B2 * | 2/2011 | Nozawa | H10K 59/128 | 359/463 |
| 11,139,346 B2 * | 10/2021 | Kim | G02B 3/00 | |
| 11,711,959 B2 * | 7/2023 | Kim | G02B 3/00 | 257/40 |
| 12,101,955 B2 * | 9/2024 | Shim | H10K 59/12 | |
| 12,439,803 B2 * | 10/2025 | Bae | H10K 39/34 | |
| 2016/0064465 A1 * | 3/2016 | Oh | H10K 59/1213 | 345/212 |
| 2017/0139291 A1 * | 5/2017 | Asozu | G02F 1/136286 | |
| 2020/0393936 A1 * | 12/2020 | Bok | G06F 3/0443 | |
| 2021/0013286 A1 * | 1/2021 | Yoon | H10K 59/123 | |
| 2023/0004253 A1 * | 1/2023 | Shin | G06F 3/0446 | |
| 2023/0077299 A1 * | 3/2023 | Lee | H10K 59/1315 | |
| 2023/0083612 A1 * | 3/2023 | Song | H10K 59/122 | 257/618 |
| 2023/0217734 A1 * | 7/2023 | Lee | H10K 59/124 | 257/72 |
| 2023/0363211 A1 * | 11/2023 | Jung | G06F 3/0412 | |
| 2024/0114726 A1 * | 4/2024 | Park | H10K 59/122 | |
| 2024/0121989 A1 * | 4/2024 | Jung | H10K 59/38 | |

(Continued)

*Primary Examiner* — Gene W Lee
(74) *Attorney, Agent, or Firm* — Fenwick & West LLP

(57) ABSTRACT

A display device may include a substrate divided into a display area and a non-display area, a gate driving circuit disposed on the substrate and disposed in the non-display area, a plurality of gate clock lines disposed on the substrate and disposed outside the gate driving circuit, a passivation layer disposed on the gate driving circuit and the plurality of gate clock lines, a common electrode disposed on the passivation layer and not overlapping with the plurality of gate clock lines, and a shielding layer located in the non-display area, disposed on the passivation layer, and overlapping with the plurality of gate clock lines.

14 Claims, 20 Drawing Sheets

S90

(56) References Cited

U.S. PATENT DOCUMENTS

| | | | | |
|---|---|---|---|---|
| 2024/0122031 | A1* | 4/2024 | Shin | H10K 50/17 |
| 2024/0138194 | A1* | 4/2024 | Park | H10K 59/1201 |
| 2024/0138224 | A1* | 4/2024 | Yang | H10K 50/865 |
| 2024/0188336 | A1* | 6/2024 | Choi | H10K 50/8445 |
| 2024/0215305 | A1* | 6/2024 | Shin | H10K 59/873 |
| 2024/0215323 | A1* | 6/2024 | Shin | H10K 59/122 |
| 2024/0215380 | A1* | 6/2024 | Shin | H10K 59/122 |
| 2024/0224605 | A1* | 7/2024 | Kim | H10K 59/131 |
| 2024/0224761 | A1* | 7/2024 | Park | H10K 59/8791 |
| 2024/0237412 | A9* | 7/2024 | Park | H10K 59/1201 |
| 2024/0237465 | A9* | 7/2024 | Yang | H10K 50/865 |
| 2024/0334746 | A1* | 10/2024 | Shin | H10K 59/122 |
| 2024/0357872 | A1* | 10/2024 | Hwang | H10K 59/8731 |
| 2024/0381698 | A1* | 11/2024 | Park | H10K 59/873 |
| 2024/0381699 | A1* | 11/2024 | Shin | H10K 59/122 |
| 2024/0389394 | A1* | 11/2024 | Park | H10K 59/38 |
| 2024/0389418 | A1* | 11/2024 | Park | H10K 59/80522 |
| 2024/0397752 | A1* | 11/2024 | Shin | H10K 59/1201 |
| 2024/0397753 | A1* | 11/2024 | Park | H10K 59/122 |
| 2024/0407234 | A1* | 12/2024 | Shin | H10K 59/873 |
| 2024/0414948 | A1* | 12/2024 | Baek | H10K 59/122 |
| 2024/0423022 | A1* | 12/2024 | Yang | H10K 71/60 |
| 2024/0431145 | A1* | 12/2024 | Lee | H10K 59/122 |
| 2025/0008810 | A1* | 1/2025 | Park | H10K 71/60 |
| 2025/0008814 | A1* | 1/2025 | Jeong | H10K 59/80522 |
| 2025/0024734 | A1* | 1/2025 | Lee | H10K 59/1201 |
| 2025/0031550 | A1* | 1/2025 | Yang | H10K 59/1201 |
| 2025/0031552 | A1* | 1/2025 | Lee | H10K 59/122 |
| 2025/0040404 | A1* | 1/2025 | Lee | H10K 59/1201 |
| 2025/0048841 | A1* | 2/2025 | Lee | H10K 59/122 |
| 2025/0056970 | A1* | 2/2025 | Shin | H10K 59/122 |
| 2025/0107400 | A1* | 3/2025 | Kim | H10K 59/122 |
| 2025/0126976 | A1* | 4/2025 | Kim | H10K 59/122 |

* cited by examiner

DISPLAY DEVICE AND METHOD OF MANUFACTURING THE SAME

CROSS REFERENCE TO RELATED APPLICATION

This application claims priority from Republic of Korea Patent Application No. 10-2023-0180719 filed on Dec. 13, 2023 and Republic of Korea Patent Application No. 10-2024-0125273 filed on Sep. 13, 2024, each of which is hereby incorporated by reference in its entirety.

TECHNICAL FIELD

Embodiments of the present disclosure relate to a display device and a method of manufacturing the same.

BACKGROUND

As the information society develops, there is increasing a demand for a display device for displaying images in various forms, and in recent years, there have been used various display devices such as liquid crystal displays and organic light emitting display devices.

For image display, a display device may include a display panel including a plurality of data lines and a plurality of gate lines, a data driving circuit for outputting data signals through the plurality of data lines, and a gate driving circuit for outputting gate signals through the plurality of gate lines.

In a conventional display field, there is developing a gate-in-panel (GIP) technology in which a gate driving circuit is embedded in a display panel in order to reduce the number of components and reduce a bezel size.

In the case that a gate driving circuit is embedded in a display panel and a narrow bezel structure is formed, there may occur unexpected abnormal operation of the gate driving circuit or display abnormalities.

SUMMARY

Embodiments of the present disclosure may provide a display device having a reliability structure capable of preventing or at least reducing abnormal operation of a gate driving circuit which may occur in a display panel with a built-in gate driving circuit, and a method of manufacturing the same.

Embodiments of the present disclosure may provide a display device with a reliability structure capable of preventing or at least reducing the display abnormalities which may occur in a display panel with a built-in gate driving circuit, and a method of manufacturing the same.

Embodiments of the present disclosure may provide a display device with a reliability structure capable of preventing or at least reducing an output deviation of gate signals in the gate driving circuit, and a method of manufacturing the same.

Embodiments of the present disclosure may provide a display device with a reliability structure capable of preventing or at least reducing the load deviation between gate clock lines input to the gate driving circuit, and a method of manufacturing the same.

Embodiments of the present disclosure may provide a display device with a reliability structure capable of preventing or at least reducing a burnt defect in at least one gate clock line which may occur in a display panel with a built-in gate driving circuit, and a method of manufacturing the same.

Embodiments of the present disclosure may provide a display device with a reliability structure capable of implementing the narrow bezel structure of a display panel with a built-in gate driving circuit without causing driving defects, image defects, or safety problems, and a method of manufacturing the same.

Embodiments of the present disclosure may provide a display device having a reliability structure in a display area and a manufacturing method thereof.

Embodiments of the present disclosure may provide a display device having a reliability structure capable of eliminating parasitic capacitance between a signal line disposed in a display area and a common electrode and a manufacturing method thereof.

Embodiments of the present disclosure may provide a display device having a reliability structure capable of enabling high-speed display driving or high-speed sensing and a manufacturing method thereof.

Embodiments of the present disclosure may provide a display device having a reliability structure enabling a reduction in the width of a signal line and thus an improvement in the aperture ratio of a display panel and a manufacturing method thereof.

A display device according to embodiments of the present disclosure may include a substrate divided into a display area and a non-display area, a gate driving circuit disposed on the substrate and disposed in the non-display area, a plurality of gate clock lines disposed on the substrate and disposed outside the gate driving circuit, a passivation layer disposed on the gate driving circuit and the plurality of gate clock lines, a common electrode disposed on the passivation layer and not overlapping with the plurality of gate clock lines, and a shielding layer located in the non-display area, disposed on the passivation layer, and overlapping with the plurality of gate clock lines.

In the display device according to embodiments of the present disclosure, the shielding layer may include a non-metal having a blocking or trapping property for moisture and oxygen. For example, the shielding layer may include a fluorine-based material.

In the display device according to embodiments of the present disclosure, the shielding layer may be spaced apart from the common electrode, and may not overlap with the common electrode in a vertical direction.

In the display device according to embodiments of the present disclosure, the plurality of gate clock lines and the common electrode may not overlap with each other.

In the display device according to embodiments of the present disclosure, the shielding layer may include a metal having a blocking or trapping property for moisture and oxygen. For example, the shielding layer may include at least one of barium, magnesium, cerium, lanthanum, and titanium.

A display device according to embodiments of the present disclosure may further include at least one signal line disposed on a substrate, a pixel electrode disposed on a passivation layer, a bank disposed on the pixel electrode and having a bank hole overlapping with a portion of the pixel electrode, an intermediate layer disposed between the pixel electrode and the common electrode in the bank hole, at least one shielding pattern disposed on the bank, and a first encapsulation layer disposed on the at least one shielding pattern and the common electrode.

According to the display device according to embodiments of the present disclosure, the shielding pattern may include the same material as the shielding layer.

According to the display device according to embodiments of the present disclosure, the common electrode may be not disposed on at least one shielding pattern, and at least one shielding pattern may overlap with at least one signal line in a vertical direction.

A display device according to embodiments of the present disclosure may include a substrate having a display area and a non-display area divided therein, at least one signal line disposed on the substrate and disposed in the display area, an overcoat layer disposed on the at least one signal line, a pixel electrode disposed on the overcoat layer, a bank having a bank hole overlapping with at least a portion of the pixel electrode, a common electrode disposed on the bank and extending inside the bank hole, and a shielding pattern disposed on the bank.

According to embodiments of the present disclosure, the common electrode may be disconnected by the shielding pattern, and the shielding pattern may overlap with at least one signal line. At least one signal line may not overlap with the common electrode.

A method of manufacturing a display device according to embodiments of the present disclosure may include a first step of forming, in a non-display area around a display area, a gate driving circuit and a plurality of gate clock lines on a substrate, forming the plurality of gate clock lines outside the gate driving circuit, forming a passivation layer on the gate driving circuit and the plurality of gate clock lines, and forming an overcoat layer and a bank on the passivation layer, a second step of forming a shielding layer in the display area and the non-display area, a third step of forming a photoresist on the shielding layer, a fourth step of developing the photoresist and remaining the photoresist in a first area in the non-display area, a fifth step of developing the shielding layer and remaining the shielding layer in a second area overlapping with the first area, and a sixth step of depositing a common electrode.

The shielding layer remaining in the second area in the fifth step may overlaps with the plurality of gate clock lines.

In the first step, in the display area, at least one signal line may be formed on the substrate, a passivation layer may be formed on the plurality of signal lines, an overcoat layer may be formed on the passivation layer, a pixel electrode may be formed on the overcoat layer in the display area, and a bank having a bank hole overlapping at least a portion of the pixel electrode may be formed.

In the fourth step, a photoresist may be remained or left in a plurality of third areas overlapping with the plurality of signal lines in the display area.

In the fifth step, a shielding layer may be remained or left in a plurality of fourth areas overlapping with the plurality of third areas. The shielding layer remained in the plurality of fourth areas may overlap with the plurality of signal lines.

The second area may overlap with the first area and may be smaller than the first area. Each of the plurality of fourth areas may be smaller than each of the plurality of third areas.

In the sixth step, the common electrode may be formed in a disconnected state around the photoresistors remaining in the first area and the plurality of third areas.

The method of manufacturing a display device according to embodiments of the present disclosure may further include, after the sixth step, a seventh step of removing the photoresist remaining in the first area and the plurality of third areas, and removing the common electrode disposed on the photoresist remaining in the first area and the plurality of third areas.

After the seventh step, the common electrode in a part overlapping with the plurality of gate clock lines may be removed, and the common electrode in a part overlapping with the plurality of signal lines may be removed. The common electrode may remain only in a portion which does not overlap with the plurality of gate clock lines and a portion that does not overlap the plurality of signal lines.

The method of manufacturing a display device according to embodiments of the present disclosure may further include, an eighth step of forming a first encapsulation layer after the seventh step.

In the non-display area, the first encapsulation layer may be disposed on the shielding layer and the common electrode, and may be interposed between the shielding layer and the common electrode. Therefore, the shielding layer and the common electrode may be separated from each other by the first encapsulation layer.

In the display area, the first encapsulation layer may be interposed between the disconnected spaces of the common electrodes, so that the common electrodes may be separated from each other by the first encapsulation layer.

The shielding layer may include a material having a blocking or trapping property for moisture and oxygen.

According to embodiments of the present disclosure, there may be provided a display device having a reliability structure capable of preventing abnormal operation of a gate driving circuit which may occur in a display panel with a built-in gate driving circuit, and a method of manufacturing the same.

According to embodiments of the present disclosure, there may be provided a display device with a reliability structure capable of preventing the display abnormalities which may occur in a display panel with a built-in gate driving circuit, and a method of manufacturing the same.

According to embodiments of the present disclosure, there may be provided a display device with a reliability structure capable of preventing an output deviation of gate signals in the gate driving circuit, and a method of manufacturing the same.

According to embodiments of the present disclosure, there may be provided a display device with a reliability structure capable of preventing the load deviation between gate clock lines input to the gate driving circuit, and a method of manufacturing the same.

According to embodiments of the present disclosure, there may be provided a display device with a reliability structure capable of preventing a burnt defect in at least one gate clock line which may occur in a display panel with a built-in gate driving circuit, and a method of manufacturing the same.

According to embodiments of the present disclosure, there may be provided a display device with a reliability structure capable of implementing the narrow bezel structure of a display panel with a built-in gate driving circuit without causing driving defects, image defects, or safety problems, and a method of manufacturing the same.

According to embodiments of the present disclosure, it is possible to reduce the weight of the display device by implementing a narrow bezel structure.

According to embodiments of the present disclosure, there may be provided a display device having a reliability structure in a display area and a manufacturing method thereof.

According to embodiments of the present disclosure, there may be provided a display device having a reliability structure capable of eliminating parasitic capacitance between a signal line disposed in a display area and a common electrode and a manufacturing method thereof.

According to embodiments of the present disclosure, there may be provided a display device having a reliability structure capable of enabling high-speed display driving or high-speed sensing and a manufacturing method thereof.

According to embodiments of the present disclosure, there may be provided a display device having a reliability structure enabling a reduction in the width of a signal line and thus an improvement in the aperture ratio of a display panel and a manufacturing method thereof.

DETAILED DESCRIPTION

Figure 1:
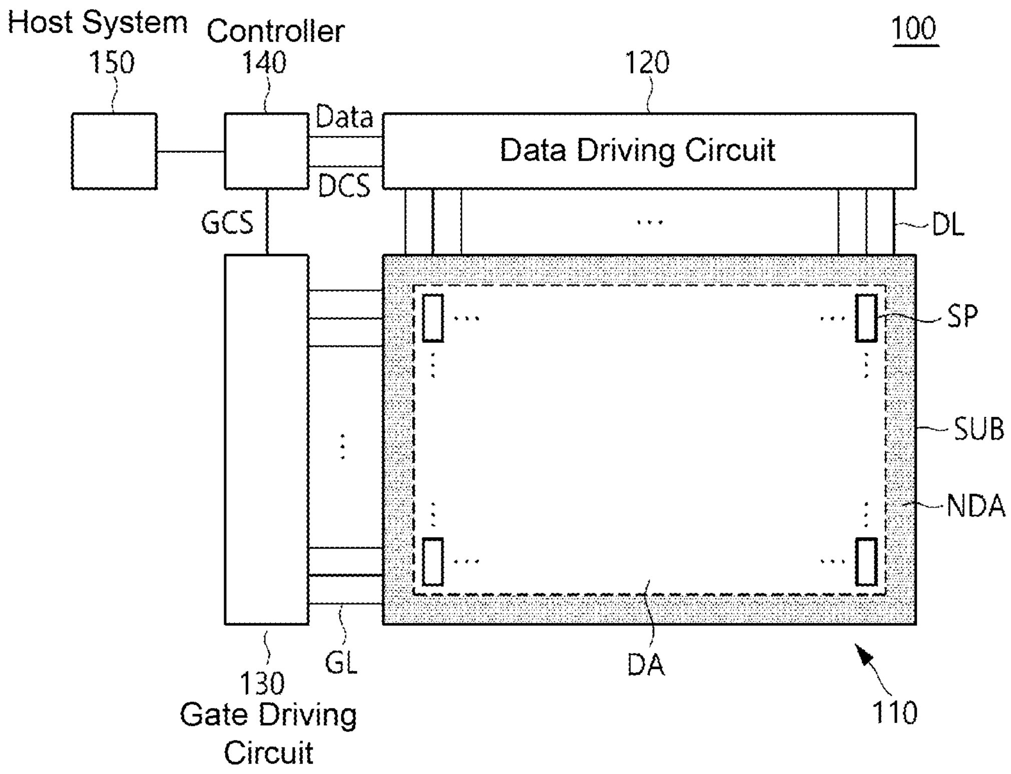
FIG. 1 is a system configuration diagram of a display device according to embodiments of the present disclosure.

Hereinafter, embodiments of the disclosure are described in detail with reference to the accompanying drawings. In assigning reference numerals to components of each drawing, the same components may be assigned the same numerals even when they are shown on different drawings. When determined to make the subject matter of the disclosure unclear, the detailed of the known art or functions may be skipped. As used herein, when a component "includes," "has," or "is composed of" another component, the component may add other components unless the component "only" includes, has, or is composed of" the other component. As used herein, the singular forms "a", "an" and "the" are intended to include the plural forms as well, unless the context clearly indicates otherwise.

Such denotations as "first," "second," "A," "B," "(a)," and "(b)," may be used in describing the components of the disclosure. These denotations are provided merely to distinguish a component from another, and the essence, order, or number of the components are not limited by the denotations.

In describing the positional relationship between components, when two or more components are described as "connected", "coupled" or "linked", the two or more components may be directly "connected", "coupled" or "linked", or another component may intervene. Here, the other component may be included in one or more of the two or more components that are "connected", "coupled" or "linked" to each other.

When such terms as, e.g., "after", "next to", and "before", are used to describe the temporal flow relationship related to components, operation methods, and fabricating methods, it may include a non-continuous relationship unless the term "immediately" or "directly" is used.

When a component is designated with a value or its corresponding information (e.g., level), the value or the corresponding information may be interpreted as including a tolerance that may arise due to various factors (e.g., process factors, internal or external impacts, or noise).

Hereinafter, various embodiments of the disclosure are described in detail with reference to the accompanying drawings.

FIG. 1 is a system configuration diagram of a display device 100 according to embodiments of the present disclosure.

Referring to FIG. 1, a display device 100 according to embodiments of the present disclosure may include a display panel 110 and a driving circuit for driving the display panel 110.

The driving circuit may include a data driving circuit 120 and a gate driving circuit 130, and may further include a controller 140 for controlling the data driving circuit 120 and the gate driving circuit 130.

The display panel 110 may include a substrate SUB and signal lines such as a plurality of data lines DL and a plurality of gate lines GL disposed on the substrate SUB. The display panel 110 may include a plurality of subpixels SP connected to a plurality of data lines DL and a plurality of gate lines GL.

The display panel 110 may include a display area DA where an image is displayed and a non-display area NDA where an image is not displayed. In the display panel 110, a plurality of subpixels SP for displaying an image may be disposed in the display area DA. In the non-display area NDA, the driving circuits 120, 130 and 140 may be electrically connected or the driving circuits 120, 130, and 140 may be mounted, and there may be disposed a pad portion to which an integrated circuit or printed circuit may be connected.

The data driving circuit 120 is a circuit for driving a plurality of data lines DL, and may output data signals to the plurality of data lines DL.

The gate driving circuit 130 is a circuit for driving a plurality of gate lines GL, and may output gate signals to the plurality of gate lines GL.

The controller 140 may supply a data control signal DCS to the data driving circuit 120 to control the operation timing of the data driving circuit 120, and may supply a gate control signal GCS to the gate driving circuit 130 to control the operation timing of the gate driving circuit 130.

The controller 140 may start scanning according to the timing implemented in each frame, may convert the input image data input from the outside to fit the data signal format used in the data driving circuit 120, and may supply converted image data Data to the data driving circuit 120 and control data driving at an appropriate time according to the scan.

The controller 140 may receive various timing signals including a vertical synchronization signal VSYNC, a horizontal synchronization signal HSYNC, an input data enable signal DE, a clock signal (LK) in addition to the input image data from the outside (e.g., the host system 150).

In order to control the data driving circuit 120 and the gate driving circuit 130, the controller 140 may receive timing signals such as a vertical synchronization signal VSYNC, a horizontal synchronization signal HSYNC, an input data enable signal DE, and a clock signal CLK, and generate various control signals DCS and GCS and output to the data driving circuit 120 and the gate driving circuit 130.

For example, the controller 140 may output various gate control signals GCS including a gate start pulse GSP, a gate shift clock GSC, and a gate output enable signal GOE in order to control the gate driving circuit 130.

In addition, in order to control the data driving circuit 120, the controller 140 may output various data control signals DCS including a source start pulse SS, a source sampling clock SSC, and a source output enable signal SOE.

The controller 140 may be implemented as a separate component from the data driving circuit 120, or may be integrated with the data driving circuit 120 and implemented as an integrated circuit.

The data driving circuit 120 may receive image data Data from the controller 140 and supply a data voltage to the plurality of data lines DL, thereby driving the plurality of data lines DL. Here, the data driving circuit 120 may be also referred to as a source driving circuit.

The data driving circuit 120 may include one or more source driver integrated circuits SDIC.

Each source driver integrated circuit SDIC may include a shift register, a latch circuit, a digital to analog converter (DAC), an output buffer. In some cases, each source driver integrated circuit SDIC may further include an analog to digital converter ADC.

For example, each source driver integrated circuit SDIC may be connected to the display panel 110 using a tape automated bonding (TAB) method, or may be connected to the bonding pad of the display panel 110 using a chip-on-glass (COG) or chip-on-panel (COP) method, or may be implemented using a chip-on-film (COF) method and connected to the display panel 110.

The gate driving circuit 130 may output a gate signal of a turn-on level voltage or a gate signal of a turn-off level voltage according to the control of the controller 140. The gate driving circuit 130 may sequentially drive a plurality of gate lines GL by sequentially supplying a gate signal with a turn-on level voltage to the plurality of gate lines GL.

The gate driving circuit 130 may be connected to the display panel 110 using a tape automated bonding (TAB) method, or may be connected to a bonding pad of the display panel 110 using a chip-on-glass (COG) or chip-on-panel (COP) method, or may be connected to the display panel 110 according to a chip-on-film (COF) method. Alternatively, the gate driving circuit 130 may be a gate-in-panel (GIP) type, and may be formed in the non-display area NDA of the display panel 110. The gate driving circuit 130 may be disposed on or connected to the substrate SUB. That is, if the gate driving circuit 130 is of the GIP type, it may be disposed in the non-display area NDA of the substrate SUB. The gate driving circuit 130 may be connected to the substrate SUB in the case of a chip-on-glass (COG) type, chip-on-film (COF) type, etc.

Meanwhile, at least one of the data driving circuit 120 and the gate driving circuit 130 may be disposed in the display area DA.

For example, the gate driving circuit 130 may be disposed in the display area DA. In this case, the gate driving circuit 130 may be disposed over the entire display area DA or only in a portion of the display area DA. The gate driving circuit 130 may be disposed not to overlap (e.g., non-overlapping) the subpixels SP, or may be disposed to partially or entirely overlap the subpixels SP.

As another example, the data driving circuit 120 may be disposed in the display area DA. In this case, the data driving circuit 120 may be disposed throughout the entire display area DA or only in a portion of the display area DA. The data driving circuit 120 may be disposed not to overlap (e.g., non-overlapping) the subpixels SP, or may be disposed to partially or entirely overlap the subpixels SP.

When a specific gate line GL is selected by the gate driving circuit 130, the data driving circuit 120 may convert the image data Data received from the controller 140 into an analog data voltage, and may supply to the plurality of data lines DL.

The data driving circuit 120 may be connected to one side (e.g., the upper or lower side) of the display panel 110. Depending on the driving method or panel design method, the data driving circuit 120 may be connected to both sides (e.g., upper and lower sides) of the display panel 110, or may be connected to two or more of the four sides of the display panel 110.

The gate driving circuit 130 may be connected to one side (e.g., left or right) of the display panel 110. Depending on the driving method or panel design method, the gate driving circuit 130 may be connected to both sides (e.g., left and right) of the display panel 110, or may be connected to two or more of the four sides of the display panel 110.

The controller 140 may be a timing controller used in typical display technology, or may be a control device capable of further performing other control functions including a timing controller, or may be a control device different from the timing controller, or may be a control device other than a timing controller, or may be a circuit within the control device. The controller 140 may be implemented with various circuits or electronic components, such as an integrated circuit (IC), a field programmable gate array (FPGA), an application specific integrated circuit (ASIC), or a processor.

The controller 140 may be mounted on a printed circuit board, a flexible printed circuit, etc., and may be electrically connected to the data driving circuit 120 and the gate driving circuit 130 through a printed circuit board, a flexible printed circuit.

The controller 140 may transmit and receive signals with the data driving circuit 120 according to one or more predetermined interfaces. For example, the interface may include a low voltage differential signaling (LVDS) interface, an embedded clock point-point interface (EPI) interface, or a serial peripheral interface (SPI).

The controller 140 may include a storage medium such as one or more registers.

The display device 100 according to embodiments of the present disclosure may be a display device in which the display panel 110 cannot emit light on its own. For example, the display device 100 according to embodiments of the present disclosure may be a liquid crystal display device including a backlight unit.

Alternatively, the display device 100 according to embodiments of the present disclosure may be a self-luminous display device in which the display panel 110 can emit light on its own. For example, the display device 100 according to embodiments of the present disclosure may be one of the display devices including an organic light emitting diode (OLED) display device, a quantum dot display, and a micro light emitting diode (Micro LED) display device.

If the display device 100 according to embodiments of the present disclosure is an organic light emitting diode display device, each subpixel SP may include an organic light emitting diode which emits light by itself as a light emitting device. If the display device 100 according to embodiments of the present disclosure is a quantum dot display device, each subpixel SP may include a light emitting element made of quantum dots, which are semiconductor crystals which emit light on their own. If the display device 100 according to embodiments of the present disclosure is a micro light emitting diode display device, each subpixel SP may include a micro light emitting diodes, which emit light on their own and are made based on inorganic materials, as a light emitting device.

Figure 2:
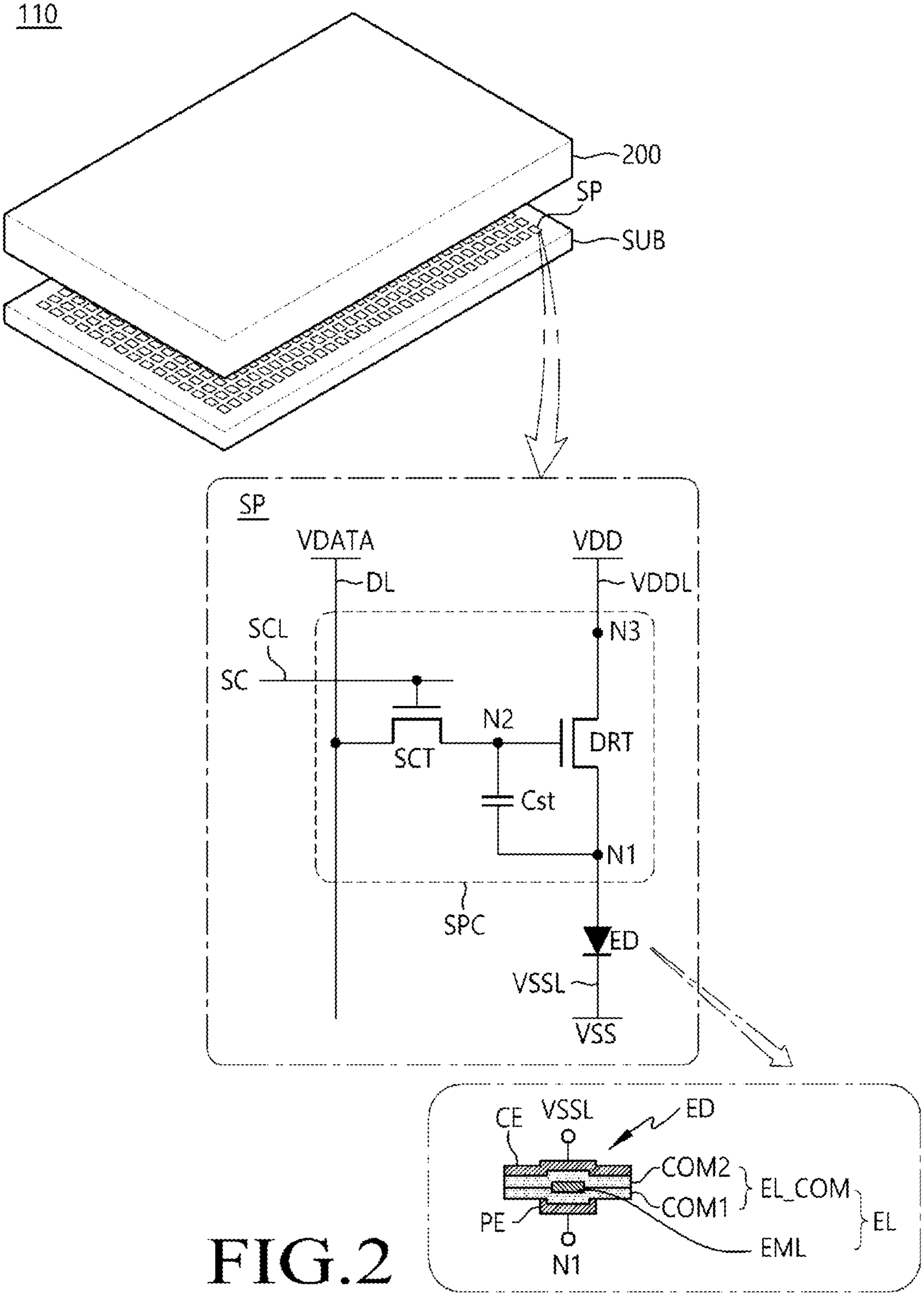
FIG. 2 illustrates a display panel according to embodiments of the present disclosure.

FIG. 2 illustrates a display panel 110 according to embodiments of the present disclosure.

Referring to FIG. 2, the display panel 110 may include a substrate SUB disposed in a plurality of subpixels SP and an encapsulation layer 200 on the substrate SUB. Here, the encapsulation layer 200 may also be referred to as an encapsulation substrate or an encapsulation portion.

Referring to FIG. 2, when the display device 100 according to embodiments of the present disclosure is a self-luminous display device, each of the plurality of subpixels SP disposed on the substrate SUB may include a light emitting device ED and a subpixel circuit SPC for driving the light emitting device ED.

Referring to FIG. 2, the subpixel circuit SPC may include a plurality of pixel driving transistors and at least one capacitor for driving the light emitting device ED. In the present disclosure, the subpixel circuit SPC may drive the light emitting device ED by supplying a driving current to the light emitting device ED at a predetermined timing. The light emitting device ED may be driven by a driving current and emit light.

The plurality of pixel driving transistors may include a driving transistor DRT for driving the light emitting device ED, and a scan transistor SCT which is turned on or off depending on the scan signal SC. The driving transistor DRT may supply driving current to the light emitting device ED.

The scan transistor SCT may be configured to control the electrical state of a corresponding node (e.g., second node, N2) in the subpixel circuit SPC or to control the state or operation of the driving transistor DRT.

At least one capacitor may include a storage capacitor Cst to maintain a constant voltage during the frame.

In order to drive the subpixel SP, a data signal VDATA which is an image signal, and a scan signal SC which is a gate signal may be applied to the subpixel SP. In addition, a common driving voltage including a first driving voltage VDD and a second driving voltage VSS may be applied to the subpixel SP in order to drive the subpixel SP.

The light emitting device ED may include a pixel electrode PE, an intermediate layer EL, and a common electrode CE. The intermediate layer EL may be disposed between the pixel electrode PE and the common electrode CE.

In the case that the light emitting device ED is an organic light emitting device, the intermediate layer EL may include the emission layer EML and a common intermediate layer EL_COM. The common intermediate layer EL_COM may include a first common intermediate layer COM1 and a second common intermediate layer COM2. The first common intermediate layer COM1 may be disposed between the pixel electrode PE and the emission layer EML, and may include at least one layer (e.g., an organic layer). The second common intermediate layer COM2 may be disposed between the emission layer EML, and may include at least one layer (e.g., an organic layer).

For example, the emission layer EML may be disposed in each of the plurality of subpixels SP, or in another example, may be commonly disposed in the plurality of subpixels SP. The common intermediate layer EL_COM may be commonly disposed across the plurality of subpixels SP.

The emission layer EML may be disposed in each emission area, and the common intermediate layer EL_COM may be commonly disposed across a plurality of emission areas and non-emission areas.

The pixel electrode PE may be an electrode disposed in each subpixel SP, and the common electrode CE may be an electrode commonly disposed in a plurality of subpixels SP.

For example, the pixel electrode PE may be an anode and the common electrode CE may be a cathode. For another example, the pixel electrode PE may be a cathode and the common electrode CE may be an anode. Hereinafter, it will be exemplified an example in which the pixel electrode PE is an anode and the common electrode CE is a cathode.

For example, the first common intermediate layer COM1 of the common intermediate layer EL_COM may include a hole injection layer HIL and a hole transport layer HTL, and the second common intermediate layer COM2 of the common intermediate layer EL_COM may include an electron transport layer ETL and an electron injection layer EIL.

The hole injection layer may inject holes from the pixel electrode PE to the hole transport layer, the hole transport layer may transport holes to the emission EML, the electron injection layer may inject electrons from the common electrode CE to the electron transport layer, and the electron transport layer may transport electrons to the emission layer EML.

For example, the common electrode CE may be electrically connected to a second driving voltage line VSSL. A second driving voltage VSS, which is a type of common driving voltage, may be applied to the common electrode CE through the second driving voltage line VSSL. The pixel electrode PE may be electrically connected directly or indirectly (via another transistor) to the first node N1 of the driving transistor DRT of each subpixel SP. In the present disclosure, "second common driving voltage VSS" may also be referred to as "base voltage VSS," and "second common driving voltage line VSSL" may be referred to as "base voltage line VSSL."

Each light emitting device ED may be composed of an overlapping portion of a pixel electrode PE, an emission layer EML in an intermediate layer EL, and a common electrode (CE). A predetermined emission area may be formed by each light emitting device ED. For example, the emission area of each light emitting device ED may include an overlapping area of the pixel electrode PE, the emission layer EML in the intermediate layer (EL), and the common electrode CE.

For example, the light emitting device ED may be an organic light emitting diode (OLED), an inorganic light emitting diode, or a quantum dot light emitting device. For example, in the case that the light emitting device ED is an organic light emitting diode OLED, the intermediate layer EL in the light emitting device ED may include an organic film containing an organic material.

The driving transistor DRT may be a driving transistor for supplying driving current to the light emitting device ED. The driving transistor DRT may be connected between a first driving voltage line VDDL and the light emitting device ED.

The driving transistor DRT may include a first node N1, a second node N2, and a third node N3. The first node N1 may be electrically connected to the light emitting device ED, the second node N2 may be applied with the data signal VDATA, and the third node N3 may be applied with a first common driving voltage VDD from the first common driving voltage line VDDL.

In the driving transistor DT, the second node N2 may be a gate node, the first node N1 may be a source node or a drain node, and the third node N3 may be a drain node or a source node. Hereinafter, for convenience of explanation, it will be described a case in which the second node N2 is a gate node, the first node N1 is a source node, and the third node N3 is a drain node in the driving transistor DRT.

The scan transistor SCT included in the subpixel circuit SPC illustrated in FIG. 2 may be a switching transistor for transmitting a data signal VDATA, which is an image signal, to the second node N2 which is the gate node of the driving transistor DRT.

The scan transistor SCT may be controlled on-off by the scan signal SC which is a gate signal applied through the scan line SCL as a type of gate line GL, and may control the electrical connection between the second node N2 of the driving transistor DRT and the data line DL. The drain electrode or source electrode of the scan transistor SCT may be electrically connected to the data line DL, and the source electrode or drain electrode of the scan transistor SCT may be electrically connected to the second node N2 of the driving transistor DRT. The gate electrode of the scan transistor SCT may be electrically connected to the scan line SCL.

The storage capacitor Cst may be electrically connected between the first node N1 and the second node N2 of the driving transistor DRT. The storage capacitor Cst may include a first capacitor electrode electrically connected to the first node N1 of the driving transistor DRT or corresponding to the first node N1 of the driving transistor DRT, and a second capacitor electrode electrically connected to the second node N2 of the driving transistor DRT or corresponding to the second node N2 of the driving transistor DRT.

The storage capacitor Cst may be an external capacitor intentionally designed outside the driving transistor DRT rather than a parasitic capacitor (e.g., Cgs, Cgd) as an internal capacitor which may exist between the first node N1 and the second node N2 of the driving transistor DRT.

Each of the driving transistor DRT and the scan transistor SCT may be an n-type transistor or a p-type transistor.

The display panel 110 may have a top emission structure or a bottom emission structure.

In the case that the display panel 110 has a top emission structure, at least a portion of the subpixel circuit SPC may overlap with at least a portion of the light emitting device ED in a vertical direction. Accordingly, there may be increased the area of the emission area and the aperture ratio.

If the display panel 110 has a bottom emission structure, the subpixel circuit SPC may not overlap with the light emitting device ED in the vertical direction.

As shown in FIG. 2, the subpixel circuit SPC may have 2T-1C structure including two transistors DRT and SCT and one capacitor Cst. In some case, the subpixel circuit SPC may further include one or more transistors or one or more capacitors.

Depending on the structure of the subpixel circuit SPC, there may vary the type and number of gate signal and/or gate lines supplied to the subpixel SP. In addition, depending on the structure of the subpixel circuit SPC, there may vary the type and number of common driving voltages supplied to the subpixel SP.

Since circuit elements within each subpixel SP (in particular, light emitting devices EDs implemented with organic light emitting diodes (OLEDs) containing organic materials) are vulnerable to external moisture or oxygen, an encapsulation layer 200 may be disposed on the display panel 110 to prevent oxygen from penetrating into the circuit elements (particularly, the light emitting device ED). The encapsulation layer 200 may be configured in various shapes to prevent the light emitting device ED from coming into contact with moisture or oxygen.

The display device 100 according to an embodiment of the present disclosure may have an extremely narrow bezel structure in which the non-display area NDA of the display panel 110 is very small.

Figure 3:
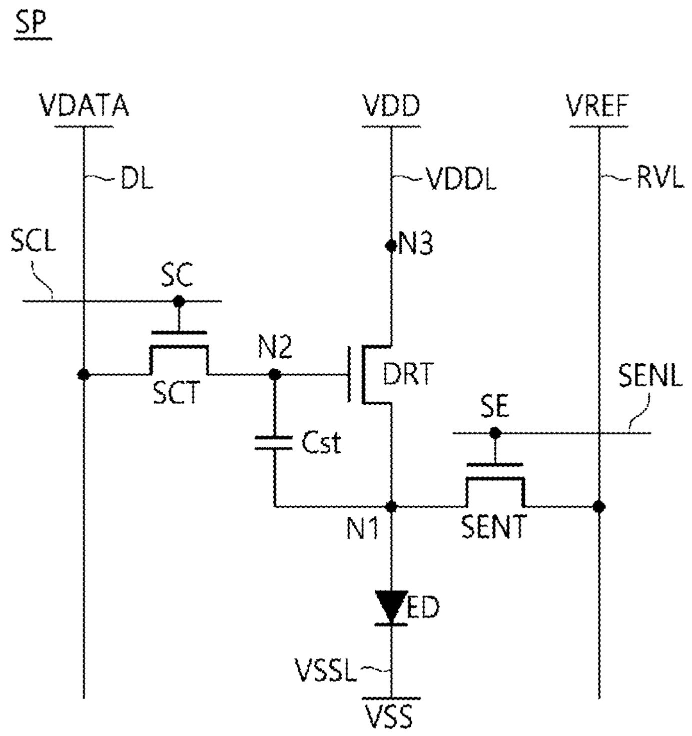
FIG. 3 is an equivalent circuit of a subpixel of a display panel according to embodiments of the present disclosure.

FIG. 3 is an equivalent circuit of a subpixel of a display panel 110 according to embodiments of the present disclosure.

Referring to FIG. 3, each of the plurality of subpixels SP disposed on the display panel 110 of the display device 100 according to embodiments of the present disclosure may further include a sensing transistor SENT compared to a subpixel SP shown in FIG. 2.

Referring to FIG. 3, the sensing transistor SENT may be controlled by a sensing signal SE, which is a type of gate signal, and may be connected between the first node N1 of the driving transistor DRT and a reference voltage line RVL. That is, the sensing transistor SENT may control the connection between the reference voltage line RVL and the first node N1 of the driving transistor DRT by being turned on or off according to the sensing signal SE supplied from a sensing signal line SENL, which is another type of gate line GL.

The sensing transistor SENT may be turned on by the sensing signal SE having a turn-on level voltage, and may transfer a reference voltage VREF supplied from the reference voltage line RVL to the first node N1 of the driving transistor DRT.

In addition, the sensing transistor SENT may be turned on by the sensing signal SE having a turn-on level voltage, and may transfer the voltage of the first node N1 of the driving transistor DRT to the reference voltage line RVL.

Here, if the sensing transistor SENT is an n-type transistor, the turn-on level voltage of the sensing signal SE may be a high level voltage. If the sensing transistor SENT is a p-type transistor, the turn-on level voltage of the sensing signal SE may be a low level voltage.

The function of the sensing transistor SENT to transfer the voltage of the first node N1 of the driving transistor DRT to the reference voltage line RVL may be used when driving to sense a characteristic value of the subpixel SP. In this case, the voltage transmitted to the reference voltage line RVL may be a voltage for calculating the characteristic value of the subpixel SP or a voltage reflecting the characteristic value of the subpixel SP.

In the present disclosure, the characteristic value of the subpixel SP may be a characteristic value of the driving transistor DRT or the light emitting device ED. For example, the characteristic values of the driving transistor DRT may include a threshold voltage and mobility of the driving transistor DRT. The characteristic value of the light emitting device ED may include a threshold voltage of the light emitting device ED.

The sensing transistor SENT may be an n-type transistor or a p-type transistor. In this disclosure, for convenience of explanation, it is described an n-type sensing transistor SENT as an example.

The scan signal line SCL and the sensing signal line SENL may be different gate lines GL. In this case, the scan signal SC and the sensing signal SE may be separate gate signals, and the on-off timing of the scan transistor SCT and the on-off timing of the sensing transistor SENT within one subpixel SP may be independent. That is, the on-off timing of the scan transistor SCT and the on-off timing of the sensing transistor SENT within one subpixel SP may be the same or different.

Alternatively, the scan signal line SCL and the sensing signal line SENL may be the same gate line GL. That is, the gate node of the scan transistor SCT and the gate node of the sensing transistor SENT within one subpixel SP may be connected to one gate line GL. In this case, the scan signal SC and the sensing signal SE may be the same gate signal, and the on-off timing of the scan transistor SCT and the on-off timing of the sensing transistor SENT within one subpixel (SP) may be the same.

Figure 4:
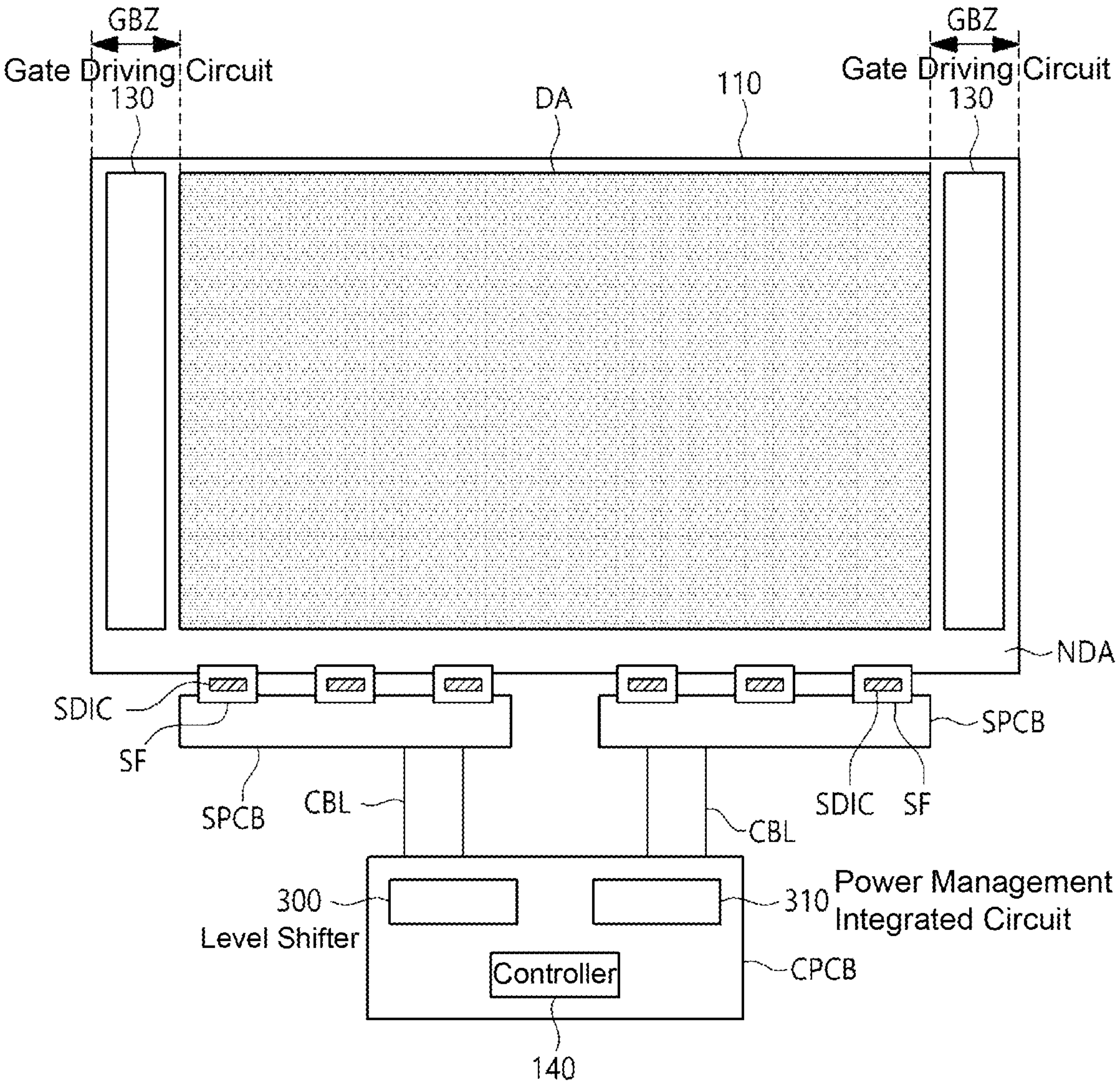
FIG. 4 illustrates an example of a system implementation of a display device according to embodiments of the present disclosure.

FIG. 4 illustrates an example of a system implementation of a display device 100 according to embodiments of the present disclosure.

Referring to FIG. 4, the display panel 110 may include a display area DA where an image is displayed and a non-display area NDA where an image is not displayed.

Referring to FIG. 4, in the case that the data driving circuit 120 includes one or more source driver integrated circuits SDIC and is implemented in a chip-on-film (COF) method, each source driver integrated circuit SDIC may be mounted on a circuit film SF connected to the non-display area NDA of the panel 110.

Referring to FIG. 4, the gate driving circuit 130 may be implemented as a gate-in-panel (GIP) type. In this case, the gate driving circuit 130 may be formed in the non-display area NDA of the display panel 110. Unlike FIG. 4, the gate driving circuit 130 may be implemented as a chip-on-film (COF) type.

For circuit connection between one or more source driver integrated circuits SDIC and other devices, the display device 100 may include at least one source printed circuit board SPCB, and a control printed circuit board CPCB for mounting control components and various electrical devices.

A film SF on which a source driver integrated circuit (SDIC) is mounted may be connected to at least one source printed circuit board SPCB. That is, one side of the film SF on which the source driver integrated circuit SDIC is mounted may be electrically connected to the display panel 110 and the other side may be electrically connected to the source printed circuit board SPCB.

The controller 140 and a power management integrated circuit (PMIC) 310 may be mounted on the control printed circuit board CPCB. The controller 140 may perform overall control functions related to driving the display panel 110 and control the operations of the data driving circuit 120 and the gate driving circuit 130. The power management integrated circuit 310 may supply various voltages or currents to the data driving circuit 120 and the gate driving circuit 130, or control various voltages or currents to be supplied.

At least one source printed circuit board SPCB and a control printed circuit board CPCB may be electrically connected through at least one connection cable CBL. Here, the connection cable CBL may be, for example, a flexible printed circuit FPC, a flexible flat cable FFC, etc.

At least one source printed circuit board SPCB and a control printed circuit board CPCB may be integrated and implemented as one printed circuit board.

The display device 100 according to embodiments of the present disclosure may further include a level shifter 300 for adjusting the voltage level. For example, the level shifter 300 may be disposed on a control printed circuit board CPCB or a source printed circuit board SPCB.

In the display device 100 according to embodiments of the present disclosure, the level shifter 300 may supply signals necessary for gate driving to the gate driving circuit 130. For example, the level shifter 300 may supply a plurality of clock signals (i.e., gate clock signals) to the gate driving circuit 130. Accordingly, the gate driving circuit 130 may generate a plurality of gate signals based on a plurality of gate clock signals input from the level shifter 300, and output the plurality of gate signals to a plurality of gate lines GL. Here, the plurality of gate lines GL may transmit a plurality of gate signals to the subpixels SP disposed in the display area DA of the substrate SUB.

Referring to FIG. 4, the non-display area NDA of the display panel 110 may include a gate bezel area GBZ where the gate driving circuit 130 and its related lines are disposed.

Referring to FIG. 4, there may be required to be disposed various lines necessary for the operation of the gate driving circuit 130 in the gate bezel area GBZ in addition to the gate driving circuit 130 of the GIP type. Here, various lines required for the operation of the gate driving circuit 130 may include a plurality of gate clock lines, at least one high level gate voltage line, and at least one low level gate voltage line.

Hereinafter, it will be described a structure of the gate bezel area GBZ of the display panel 110 according to embodiments of the present disclosure. Hereinafter, for convenience of explanation, a gate driving circuit 130 of GIP type may be referred to as a gate-in-panel circuit GIPC.

Figure 5:
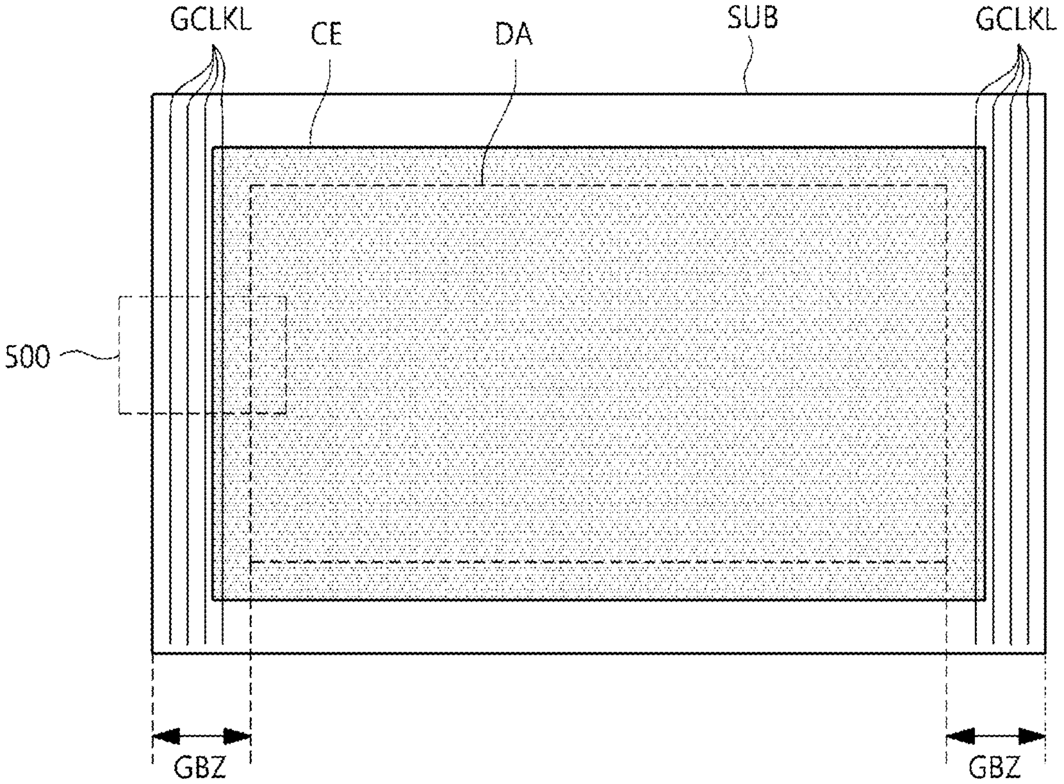
FIG. 5 is a plan view of a display panel according to embodiments of the present disclosure.

FIG. 5 is a plan view of a display panel 110 according to embodiments of the present disclosure.

Referring to FIG. 5, the display panel 110 according to embodiments of the present disclosure may include a common electrode CE for constituting a light emitting device ED of each subpixel SP.

Referring to FIG. 5, in the display panel 110, the substrate SUB may include a display area DA in which an image can be displayed and a non-display area NDA in which an image is not displayed. A plurality of subpixels SP may be disposed in the display area DA. The non-display area NDA may be an area outside the display area DA.

Referring to FIG. 5, in the display panel 110, the common electrode CE may be disposed on the substrate SUB, may be disposed on the entire display area DA, and may extend to a portion of the non-display area NDA.

Referring to FIG. 5, the non-display area NDA may include a gate bezel area GBZ including an area where the gate driving circuit 130 and its related lines are disposed. The common electrode CE may extend to a portion of the gate bezel area GBZ. That is, the common electrode CE may overlap with a portion of the gate bezel area GBZ.

The common electrode CE is a type of display driving electrode for configuring the light emitting devices ED, and may be an electrode to which a base voltage VSS is applied. For example, the base voltage VSS applied to the common electrode CE may be a ground voltage.

A gate driving circuit 130 of GIP type may be disposed in the gate bezel area GBZ.

The gate driving circuit 130 may be disposed only on the first side (e.g., left side) of the display area DA, or may be disposed on both the first side (e.g., left side) and the second side (e.g., right side) of the display area DA. Accordingly, the location of the gate bezel area GBZ may vary. That is, the gate bezel area GBZ may exist only on the first side (e.g., left side) of the display area DA, and may exist in both the first side (e.g., left side) and the second side (e.g., right side) of the display area DA.

In addition, a plurality of gate clock lines GCLKL may be disposed in the gate bezel area GBZ to supply gate clock signals required for an operation of the gate driving circuit 130 to the gate driving circuit 130.

The number of gate clock lines GCLKL may vary depending on the gate driving method. For example, the number of gate clock lines GCLKL may be 2, 4, 6, or 8.

The plurality of gate clock lines GCLKL may be disposed only on the first side (e.g., left side) of the display area DA, or may be disposed on both the first side (e.g., left side) and the second side (e.g., right side) of the display area DA.

In addition, a high-level gate voltage line may be disposed in the gate bezel area GBZ to supply a high-level gate voltage necessary for the operation of the gate driving circuit 130 to the gate driving circuit 130.

In addition, a low-level gate voltage line for supplying the low-level gate voltage required for operation of the gate driving circuit 130 to the gate driving circuit 130 may be disposed in the gate bezel area GBZ.

Meanwhile, if the display panel 110 has a narrow bezel structure, it is required to reduce the gate bezel area GBZ, and as a result, the common electrode CE may overlap with at least one of the plurality of gate clock lines GCLKL. In this case, a capacitor may be formed between at least one of the plurality of gate clock lines GCLKL and the common electrode CE.

The capacitor formed between the common electrode CE and the gate clock line GCLKL may correspond to an undesirable parasitic capacitor, and there may cause undesirable effects on both the common electrode CE and the gate clock line GCLKL.

Figure 6:
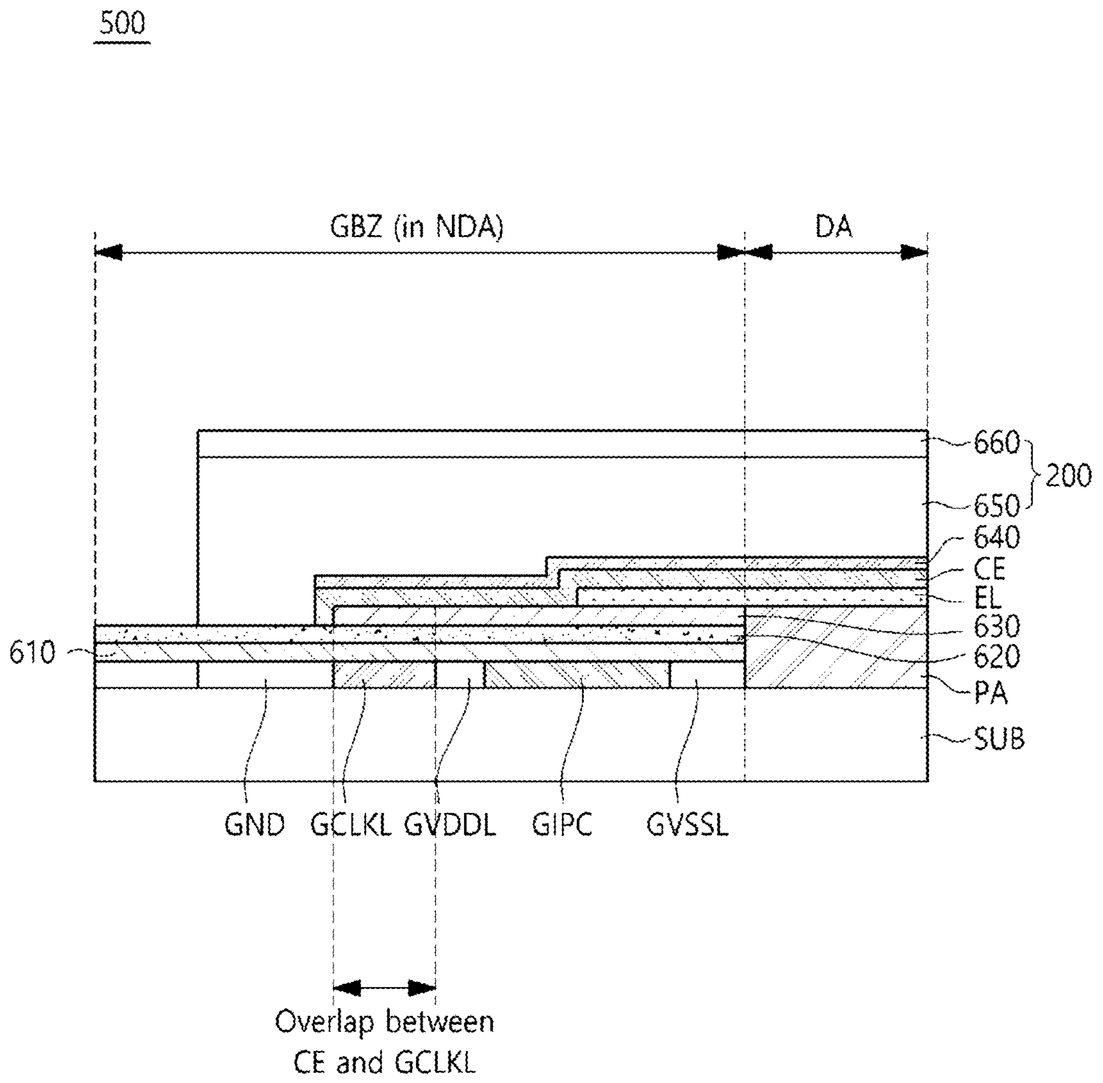
FIG. 6 is a cross-sectional view of a display panel according to embodiments of the present disclosure.

FIG. 6 is a cross-sectional view of a display panel 110 according to embodiments of the present disclosure. FIG. 6 is a cross-sectional view of an area 500 including a portion of the display area DA and the gate bezel area GBZ in FIG. 5.

Referring to FIG. 6, in order for the display panel 110 according to embodiments of the present disclosure to have a narrow level structure, it is required to reduce the gate bezel area GBZ, and as a result, the common electrode CE may overlap with at least one of the plurality of gate clock lines GCLKL. In this case, a capacitor may be formed between at least one of the plurality of gate clock lines GCLKL and the common electrode CE.

Referring to FIG. 6, the display panel 110 according to embodiments of the present disclosure may include a gate-in-panel circuit GIPC, at least one first gate voltage line GVDDL disposed outside the gate-in-panel circuit GIPC, at least one second gate voltage line GVSSL disposed inside the gate-in-panel circuit GIPC, and a plurality of gate clock lines GCLKL disposed outside of at least one first gate voltage line GVDDL.

The gate-in-panel circuit GIPC, at least one first gate voltage line GVDDL, at least one second gate voltage line GVSSL, and a plurality of gate clock lines GCLKL may be disposed on the substrate SUB, and may be disposed in the gate bezel area GBZ in the non-display area NDA.

Referring to FIG. 6, the display panel 110 according to embodiments of the present disclosure may further include a ground line GND disposed further outside the plurality of gate clock lines GCLKL.

Referring to FIG. 6, the display panel 110 according to embodiments of the present disclosure may include a pixel area PA within the display area DA. The pixel area PA may include various transistors (e.g., driving transistor DRT, scan transistor SCT, etc.) and capacitors (e.g., storage capacitor Cst, etc.) included in the subpixels SP. In addition, the pixel area PA may further include pixel electrodes PE included in the light emitting device ED.

Referring to FIG. 6, the display panel 110 according to embodiments of the present disclosure may further include a passivation layer 610 disposed on a gate-in-panel circuit GIPC and a plurality of gate clock lines GCLKL, an overcoat layer 620 disposed on the passivation layer 610, and a bank 630 disposed on the overcoat layer 620.

Referring to FIG. 6, the display panel 110 according to embodiments of the present disclosure may further include an intermediate layer EL disposed on the pixel electrodes PE and the bank 630 in the pixel area PA, and a common electrode CE disposed on the intermediate layer EL.

Referring to FIG. 6, the display panel 110 according to embodiments of the present disclosure may further include a capping layer 640 disposed on the common electrode CE.

Referring to FIG. 6, the display panel 110 according to embodiments of the present disclosure may further include an encapsulation layer 200 on the capping layer 640. The encapsulation layer 200 may include an adhesive layer 650 on the capping layer 640 and a metal encapsulation layer 660 on the adhesive layer 650.

Referring to FIG. 6, the common electrode CE may be disposed in the display area DA, and may extend to the gate bezel area GBZ in the non-display area NDA.

Referring to FIG. 6, in order for the display panel 110 according to embodiments of the present disclosure to have a narrow bezel structure, there is required to reduce the gate bezel area GBZ.

Accordingly, in the gate bezel area GBZ in the non-display area NDA, the common electrode CE may overlap with at least one second gate voltage line GVSSL and the gate-in-panel circuit GIPC.

In addition, in the gate bezel area GBZ within the non-display area NDA, the common electrode CE may overlap with at least a portion of the plurality of gate clock lines GCLKL.

As described above, as the display panel 110 according to embodiments of the present disclosure has a narrow bezel structure, the common electrode CE may overlap with at least one of the plurality of gate clock lines GCLKL. In this case, a capacitor may be formed between at least one of the plurality of gate clock lines GCLKL and the common electrode CE.

The capacitor formed between the common electrode CE and the gate clock line GCLKL may correspond to an unwanted parasitic capacitor, and which may cause an undesirable effect on both the common electrode CE and the gate clock line GCLKL.

For example, the capacitor induced in at least one of the plurality of gate clock lines GCLKL by the common electrode CE may act as an unnecessary load or cause deformation of the gate clock signal. In addition, there may occur the output deviation between gate signals output from the gate driving circuit 130, which may lead to abnormal gate driving operation, and thus may deteriorate image quality.

Even if a capacitor is formed between the plurality of gate clock lines GCLKL and the common electrode CE in the display panel 110, there may be more desirable for no capacitor deviation to occur.

However, even if the panel is designed so that the plurality of gate clock lines GCLKL do not overlap the common electrode CE, there is a high possibility that some of the plurality of gate clock lines GCLKL overlap with the common electrode CE due to process errors which inevitably occur during panel manufacturing.

The load deviation (which can also be referred to as "capacitance load deviation") in the gate clock line GCLKL caused by the common electrode CE may cause abnormal gate driving, and thus may cause image abnormalities. For example, there may occur a phenomenon in which abnormal horizontal lines appear on the screen (which may be called as a line dim phenomenon).

In addition, in the case that the common electrode CE overlaps with at least one of the plurality of gate clock lines GCLKL in order to implement a narrow bezel structure, the burnt defects may occur due to static electricity. For example, when the common electrode CE overlaps with at least one of the plurality of gate clock lines GCLKL, there may be occurred the burnt defects due to static electricity in at least one gate clock line GCLKL overlapping with the common electrode CE.

Accordingly, the display panel 110 according to embodiments of the present disclosure may include a reliability structure capable of fundamentally preventing an overlapping of the common electrode CE and the plurality of gate clock lines GCLKL. Hereinafter, it will be described a reliability structure for the display panel 110 according to embodiments of the present disclosure.

Figure 7:
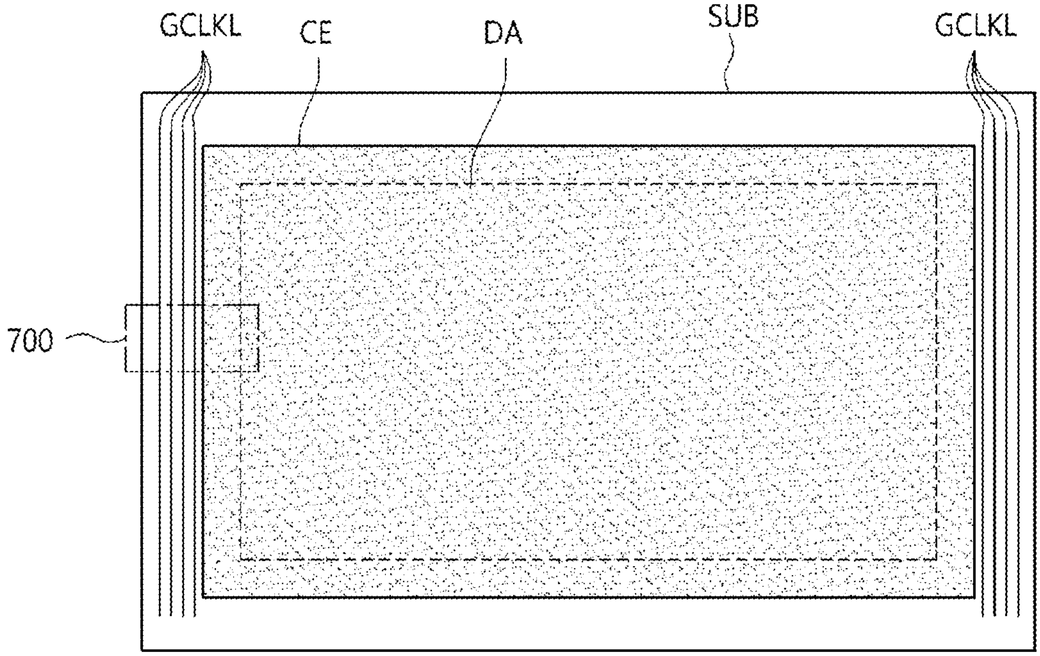
FIG. 7 is a plan view of a display panel having a reliability structure according to embodiments of the present disclosure.

FIG. 7 is a plan view of a display panel 110 having a reliability structure according to embodiments of the present disclosure.

Referring to FIG. 7, the display panel 110 according to embodiments of the present disclosure may include a display area DA capable of displaying an image, and a non-display area NDA in which an image is not displayed. A plurality of subpixels SP may be disposed in the display area DA. The non-display area NDA may be an area outside the display area DA.

Referring to FIG. 7, the non-display area NDA may include a gate bezel area GBZ located outside the display area DA in a row direction (or column direction).

Referring to FIG. 7, the display panel 110 according to embodiments of the present disclosure may include a common electrode CE for forming a light emitting device ED of each subpixel SP. The common electrode CE may be disposed on the substrate SUB, may be disposed through the entire display area DA, and may extend to a portion of the non-display area NDA. For example, the common electrode CE may extend to a portion of the gate bezel area GBZ within the non-display area NDA.

Referring to FIG. 7, the display panel 110 according to embodiments of the present disclosure may include a plurality of gate clock lines GCLKL disposed in the non-display area NDA. The plurality of gate clock lines GCLKL may pass through the gate bezel area GBZ in the non-display area NDA.

Referring to FIG. 7, the display panel 110 according to embodiments of the present disclosure may have a reliability structure which fundamentally prevents the common electrode CE and the plurality of gate clock lines GCLKL from overlapping.

Figure 8:
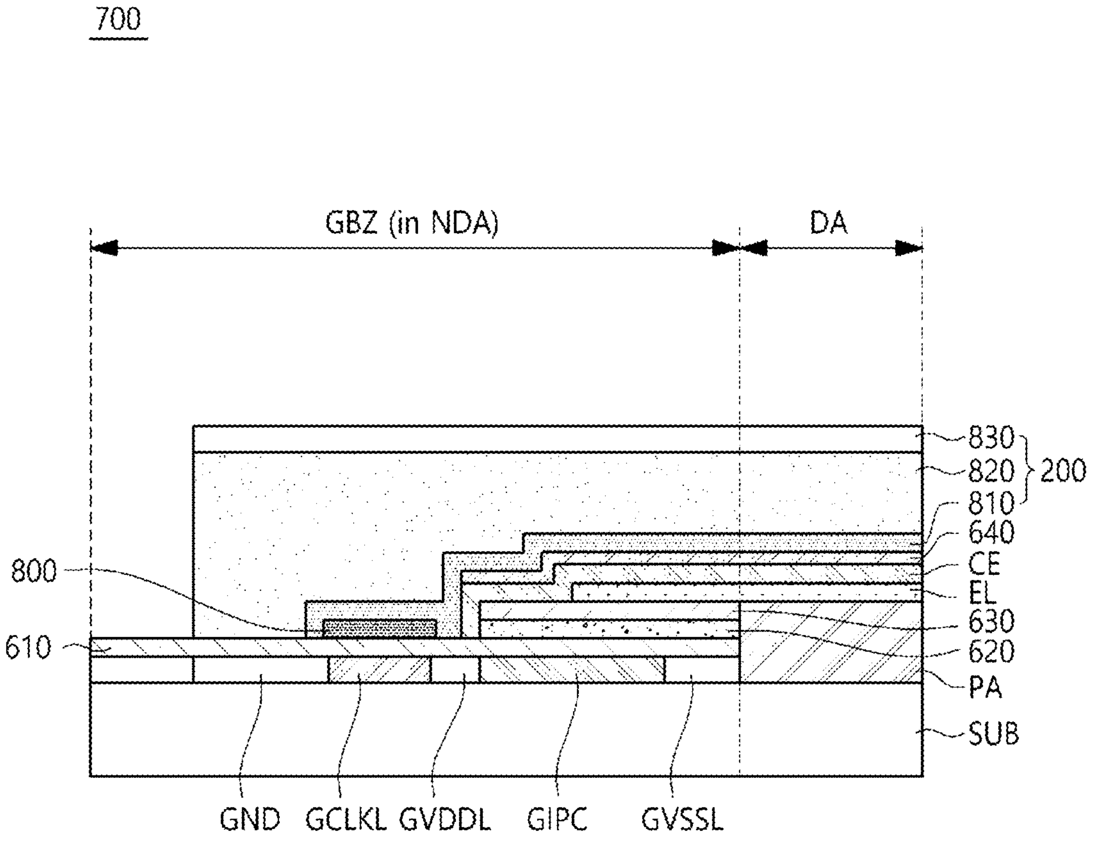
FIG. 8 is a cross-sectional view of a display panel having a reliability structure according to embodiments of the present disclosure.

FIG. 8 is a cross-sectional view of the display panel 110 having a reliability structure according to embodiments of the present disclosure. FIG. 8 is a cross-sectional view of an area 700 including a portion of the display area DA and the gate bezel area GBZ in FIG. 7. In the following description, it will be omitted descriptions of content which is the same as that described above.

Referring to FIG. 8, the display panel 110 according to embodiments of the present disclosure may include a gate-in-panel circuit GIPC which is a GIP type gate driving circuit 130, at least one first gate voltage line GVDDL disposed outside the gate-in-panel circuit GIPC, at least one second gate voltage line GVSSL disposed inside the gate-in-panel circuit GIPC, and a plurality of gate clock lines GCLKL disposed outside of at least one first gate voltage line GVDDL.

Referring to FIG. 8, a gate-in-panel circuit GIPC, at least one first gate voltage line GVDDL, at least one second gate voltage line GVSSL, and a plurality of gate clock lines GCLKL may be disposed on the substrate SUB, and may be disposed in the gate bezel area GBZ within the non-display area NDA.

Referring to FIG. 8, the display panel 110 according to embodiments of the present disclosure may further include a ground line GND disposed further outside the plurality of gate clock lines GCLKL.

Referring to FIG. 8, the display panel 110 according to embodiments of the present disclosure may further include a pixel area PA within the display area DA. The pixel area PA may include various transistors (e.g., driving transistor DRT, scan transistor SCT, etc.) and a capacitor (e.g., storage capacitor Cst, etc.) included in the subpixels SP. In addition, the pixel area PA may further include pixel electrodes PE included in the light emitting device ED.

Referring to FIG. 8, the display panel 110 according to embodiments of the present disclosure may further include a passivation layer 610 disposed on a gate-in-panel circuit GIPC and a plurality of gate clock lines GCLKL, an overcoat layer 620 disposed on the passivation layer 610, and a bank 630 disposed on the overcoat layer 620.

Referring to FIG. 8, the display panel 110 according to embodiments of the present disclosure may further include an intermediate layer EL disposed on the pixel electrodes PE and the bank 630 in the pixel area PA, and a common electrode CE disposed on the intermediate layer EL.

Referring to FIG. 8, the display panel 110 according to embodiments of the present disclosure may further include a capping layer 640 disposed on the common electrode CE.

Referring to FIG. 8, the display panel 110 according to embodiments of the present disclosure may further include an encapsulation layer 200 on the capping layer 640.

The encapsulation layer 200 may include a first encapsulation layer 810, a second encapsulation layer 820, and a third encapsulation layer 830.

The second encapsulation layer 820 may be arranged to cover the first encapsulation layer 810. The third encapsulation layer 830 may be disposed on the second encapsulation layer 820.

For example, the first encapsulation layer 810 may be an inorganic film. The second encapsulation layer 820 may include an adhesive layer, and may further include a moisture absorbent. The third encapsulation layer 830 may be a metal thin film.

Referring to FIG. 8, the common electrode CE may be disposed in the display area DA, and may extend to the gate bezel area GBZ in the non-display area NDA.

That is, referring to FIG. 8, the display panel 110 of the display device 100 according to embodiments of the present disclosure may include a substrate SUB with a display area DA and a non-display area NDA partitioned, a gate-in-panel circuit GIPC which is a GIP-type gate driving circuit 130 disposed on a substrate SUB and in the non-display area NDA, a plurality of gate clock lines GCLKL disposed on the substrate SUB and outside the gate-in-panel circuit GIPC, a passivation layer 610 disposed on the gate-in-panel circuit GIPC and a plurality of gate clock lines GCLKL, and a common electrode CE which is disposed on the passivation layer 610 and does not overlap with the plurality of gate clock lines GCLKL.

Referring to FIG. 8, the display panel 110 of the display device 100 according to embodiments of the present disclosure may include a shielding layer 800 as a reliability structure capable of fundamentally preventing the common electrode CE and the plurality of gate clock lines GCLKL from overlapping with each other.

Referring to FIG. 8, in the display panel 110 according to embodiments of the present disclosure, the shielding layer 800 may be disposed in the non-display area NDA, may be disposed on the passivation layer 610, and may overlap with the plurality of the gate clock lines GCLKL.

Referring to FIG. 8, the display panel 110 of the display device 100 according to embodiments of the present disclosure may further include at least one first gate voltage line GVDDL disposed between the gate-in-panel circuit GIPC and the plurality of gate clock lines GCLKL and transmitting a first gate voltage to the gate-in-panel circuit GIPC, and at least one second gate voltage line GVSSL disposed between the gate-in-panel circuit GIPC and the display area DA and transmitting a second gate voltage different from the first gate voltage to the gate-in-panel circuit GIPC.

For example, the first gate voltage may be a high-level gate voltage, and the second gate voltage may be a low-level gate voltage. Alternatively, the first gate voltage may be a low-level gate voltage, and the second gate voltage may be a high-level gate voltage.

Referring to FIG. 8, the common electrode CE may overlap with at least one second gate voltage line GVSSL. The common electrode CE does not overlap with at least one first gate voltage line GVDDL.

Referring to FIG. 8, the display panel 110 of the display device 100 according to embodiments of the present disclosure may further include a ground line GND disposed further outside the plurality of gate clock lines GCLKL.

Referring to FIG. 8, the display panel 110 of the display device 100 according to embodiments of the present disclosure may further include a first encapsulation layer 810 disposed on the shielding layer 800 and the common electrode CE and interposed between the shielding layer 800 and the common electrode CE.

Referring to FIG. 8, the shielding layer 800 and the common electrode CE may be separated from each other by the first encapsulation layer 810. The first encapsulation layer 810 may cover both an upper surface and a side surface of the shielding layer 800.

Referring to FIG. 8, a capping layer 640 may be disposed between a portion of the common electrode CE and a portion of the first encapsulation layer 810.

Referring to FIG. 8, the display panel 110 of the display device 100 according to embodiments of the present disclosure may further include an overcoat layer 620 disposed on a passivation layer 610, and a bank 630 on the overcoat layer 620.

Referring to FIG. 8, the common electrode CE may be disposed on the overcoat layer 620, and may be extended and disposed on the outer side of the overcoat layer 620. The common electrode CE may be disposed on the bank 630, and may extend to be disposed on the outer side of the bank 630.

Referring to FIG. 8, the display panel 110 of the display device 100 according to embodiments of the present disclosure may further include an intermediate layer EL as part of the layers PE, EL and CE for configuring the light emitting device ED in the display area DA. Here, the intermediate layer EL may include at least one organic layer extending from the display area DA to a portion of the non-display area NDA.

Referring to FIG. 8, the intermediate layer EL may overlap with at least one second gate voltage line GVSSL. Additionally, the intermediate layer EL may overlap with at least a portion of the gate-in-panel circuit GIPC.

Referring to FIG. 8, in the display panel 110 according to embodiments of the present disclosure, the shielding layer 800 may be disposed in the non-display area NDA, may be disposed on the passivation layer 610, and may overlap with the plurality of gate clock lines GCLKL.

Referring to FIG. 8, in the display panel 110 according to embodiments of the present disclosure, the shielding layer 800 may be spaced apart from the common electrode CE, and may not overlap with the common electrode CE in the vertical direction.

In the display panel 110 according to embodiments of the present disclosure, the shielding layer 800 may include a non-metal having blocking or trapping properties for moisture and oxygen. For example, the shielding layer 800 may include a fluorine-based material.

In the display panel 110 according to embodiments of the present disclosure, the shielding layer 800 may include a metal having blocking or trapping properties for moisture and oxygen. For example, the shielding layer 800 may include at least one of barium, magnesium, cerium, lanthanum, and titanium.

In the display panel 110 according to embodiments of the present disclosure, the shielding layer 800 may include a non-metal having blocking or trapping properties for moisture and oxygen, and a metal having blocking or trapping characteristics for moisture and oxygen.

As described above, according to the reliability structure of the display panel 110 according to embodiments of the present disclosure, the common electrode CE does not overlap (e.g., non-overlapping) with the plurality of gate clock lines GCLKL. Accordingly, it is possible to prevent or a at least reduce the unwanted parasitic capacitor from being formed between the common electrode CE and the gate clock line GCLKL.

According to the reliability structure of the display panel 110 according to the embodiments of the present disclosure, it is possible to prevent or at least reduce unnecessary load from being generated on the plurality of gate clock lines GCLKL by the common electrode CE, to prevent the deformation of the gate clock signal, and to prevent the output deviation between gate signals output from the gate driving circuit 130. Accordingly, there may be achieved the normal gate driving operation.

According to the reliability structure of the display panel 110 according to embodiments of the present disclosure, it is possible to prevent or at least reduce unnecessary parasitic capacitors from being formed between the plurality of gate clock lines GCLKL and the common electrode CE in the display panel 110. Therefore, naturally, it is possible to prevent or at least reduce an occurrence of the parasitic capacitor deviation.

According to the reliability structure of the display panel 110 according to embodiments of the present disclosure, since gate signal output deviation does not occur, it is possible to prevent or at least reduce image quality degradation. For example, it is possible to prevent or at least reduce the abnormal horizontal line display phenomenon (i.e., line dim phenomenon) due to the overlapping of at least one of the plurality of gate clock lines GCLKL and the common electrode CE.

According to the reliability structure of the display panel 110 according to embodiments of the present disclosure, it is possible to prevent or at least reduce the burnt defects due to the static electricity generated when the common electrode CE overlaps at least one of the plurality of gate clock lines GCLKL.

Figure 9A:
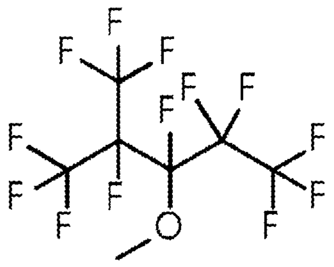
FIGS. 9A and 9B illustrate shielding layer materials in a display panel according to embodiments of the present disclosure.
Figure 9B:
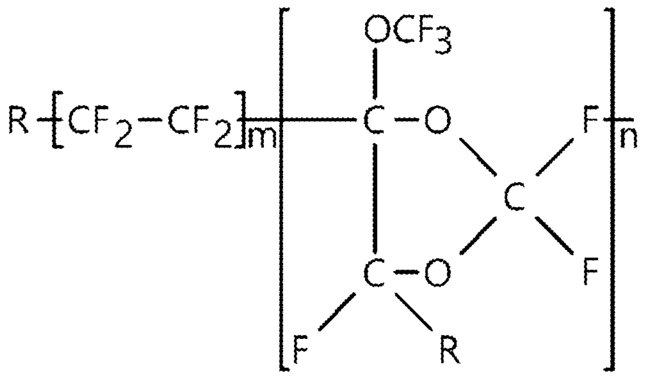

FIGS. 9A and 9B illustrate materials of the shielding layer 800 in a display panel 110 according to embodiments of the present disclosure.

In the display panel 110 according to embodiments of the present disclosure, the shielding layer 800 may include a non-metal which has blocking or trapping properties for moisture and oxygen. For example, the shielding layer 800 may include a fluorine-based material.

For example, if the shielding layer 800 includes a fluorine-based material, there may be effective in improving reliability by preventing moisture or oxygen from penetrating into the gate bezel area GBZ owing to its moisture blocking and oxygen trapping effects.

For example, referring to FIGS. 9A and 9B, the fluorine-based material may be a single molecule or a composite containing a large number of fluorine (F) based on a carbon-carbon backbone. The fluorine-based solvent may be as shown in FIG. 9A, and the shielding layer 800 containing a fluorine-based material may be as shown in FIG. 9B.

Material inspection of the shielding layer 800 may be checked through TOF-SIMS analysis.

The shielding layer 800 containing a fluorine-based material may have orthogonality characteristics due to the large amount of fluorine, and may separate from and reject moisture (H2O).

The shielding layer 800 containing a fluorine-based material may be oxidized by oxygen to form a covalent bond with the fluorine-based material, thereby providing an oxygen trapping effect.

In the display panel 110 according to embodiments of the present disclosure, the shielding layer 800 may include a metal which has blocking or trapping properties for moisture and oxygen. For example, the shielding layer 800 may include at least one of barium, magnesium, cerium, lanthanum, and titanium.

In the display panel 110 according to embodiments of the present disclosure, the shielding layer 800 may include a non-metal having blocking or trapping properties for moisture and oxygen, and a metal having blocking or trapping properties for moisture and oxygen.

The reliability structure according to the embodiments of the present disclosure may be configured in the non-display area NDA of the display panel 110. Accordingly, it is possible to fundamentally prevent or at least reduce at least one gate clock line GCLKL arranged in the non-display area NDA of the display panel 110 from overlapping with the common electrode CE.

The reliability structure according to the embodiments of the present disclosure may also be configured in a display area DA of the display panel 110. Accordingly, hereinafter, it will be described a case where the reliability structure according to the embodiments of the present disclosure is configured in the display area DA and the non-display area NDA of the display panel 110.

Figure 10:
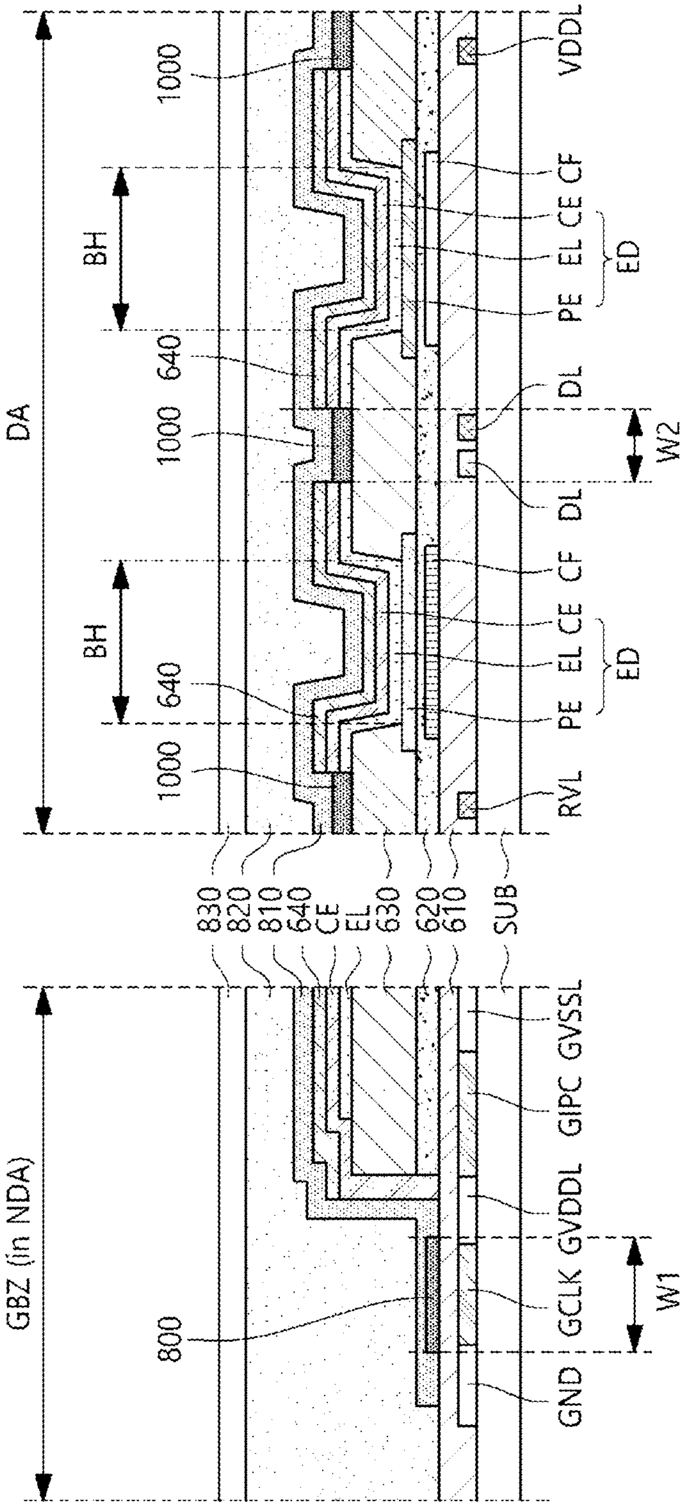
FIG. 10 is a cross-sectional view of a display area and a non-display area of a display panel in the case that a display panel according to embodiments of the present disclosure has a reliability structure.

FIG. 10 is a cross-sectional view of the display area DA and the non-display area NDA of the display panel 110 in the case that the display panel 110 according to the embodiments of the present disclosure has the reliability structure.

Referring to FIG. 10, the reliability structure according to the embodiments of the present disclosure may be configured in the display area DA and the non-display area NDA of the display panel 110.

The vertical structure of the display panel 110 in which the reliability structure according to the embodiments of the present disclosure is configured in the non-display area NDA may be same as shown in FIG. 8. Therefore, hereinafter, it will be described a vertical structure of the display panel 110 in which the reliability structure according to the embodiments of the present disclosure is configured in the display area DA, and there may be omitted the description of a vertical structure of the display panel 110 in which the reliability structure according to the embodiments of the present disclosure is configured in the non-display area NDA.

In the case that the reliability structure according to the embodiments of the present disclosure is configured in the display area DA of the display panel 110, it is possible to fundamentally prevent or at least reduce at least one signal line DL, RVL and VDDL arranged in the display area DA from overlapping with the common electrode CE. Accordingly, it is possible to prevent or at least reduce abnormal display driving operation and screen abnormality that may occur when at least one signal line DL, RVL and VDDL overlaps with the common electrode CE.

Referring to FIG. 10, the reliability structure of the display panel 110 according to the embodiments of the present disclosure may be configured in a non-display area NDA and a display area DA.

Referring to FIG. 10, gate driving related circuits may be disposed in the non-display area NDA of the display panel 110 according to the embodiments of the present disclosure. The gate driving related circuits may be disposed on the substrate SUB, and may be disposed in the gate bezel area GBZ within the non-display area NDA.

The gate driving related circuits may include a gate-in-panel circuit GIPC disposed on a substrate SUB, at least one first gate voltage line GVDDL disposed outside the gate-in-panel circuit GIPC, at least one second gate voltage line GVSSL disposed inside the gate-in-panel circuit GIPC, and a plurality of gate clock lines GCLKL disposed outside the at least one first gate voltage line GVDDL.

Referring to FIG. 10, in a non-display area NDA of a display panel 110 according to embodiments of the present disclosure, a ground line GND may be disposed outside the plurality of gate clock lines GCLKL.

Referring to FIG. 10, in the non-display area NDA of the display panel 110 according to the embodiments of the present disclosure, a passivation layer 610 may be disposed on gate driving related circuits and a ground line GND.

An overcoat layer 620 and a bank 630 may be disposed on the passivation layer 610 by extending from the display area DA to a portion of the non-display area NDA.

An intermediate layer EL may be disposed on the bank 630 by extending from the display area DA to a portion of the non-display area NDA. Here, the intermediate layer EL may be an organic layer.

A common electrode CE may be disposed on the intermediate layer EL by extending from the display area DA to a portion of the non-display area NDA.

The common electrode CE may extend further outward than the intermediate layer EL.

The common electrode CE may extend along the side of the bank 630 and the overcoat layer 620.

A first encapsulation layer 810 may be disposed to extend from the display area DA to a portion of the non-display area NDA, and cover the common electrode CE extended to the non-display area NDA.

In the non-display area NDA, the first encapsulation layer 810 may be disposed to extend further outward than the common electrode CE.

In the non-display area NDA, the first encapsulation layer 810 may be disposed to cover a shielding layer 800 disposed further outward than the common electrode CE.

Referring to FIG. 10, according to the reliability structure according to the embodiments of the present disclosure, the common electrode CE may be extended to the non-display area NDA, but may not extend to the upper portion of at least one gate clock line GCLKL, and the shielding layer 800 disposed further outside the common electrode CE may be disposed to overlap with at least one gate clock line GCLKL.

A width W1 of the shielding layer 800 may be greater than a width of the area where at least one gate clock line GCLKL overlapping with the shielding layer 800 is disposed.

According to the reliability structure according to the embodiments of the present disclosure, it is possible to fundamentally prevent at least one gate clock line GCLKL disposed in the non-display area NDA of the display panel 110 from overlapping with the common electrode CE. This may prevent abnormal gate driving operation and display abnormality that may occur when at least one gate clock line GCLKL overlaps with the common electrode CE.

Referring to FIG. 10, the display area DA of the display panel 110 according to the embodiments of the present disclosure may include at least one signal line DL, RVL and VDDL disposed on a substrate SUB, a pixel electrode PE disposed on a passivation layer 610, a bank 630 disposed on the pixel electrode PE and having a bank hole BH overlapping with a part of the pixel electrode PE, an intermediate layer EL disposed between the pixel electrode PE and the common electrode CE in the bank hole BH, and a common electrode CE disposed on the intermediate layer EL.

In the bank hole BH, the pixel electrode PE, the intermediate layer EL, and the common electrode CE may be overlapped to form a light emitting device ED.

Referring to FIG. 10, in the display area DA of the display panel 110 according to the embodiments of the present disclosure, each of the intermediate layer EL and the common electrode CE may be disposed on the upper portion of the bank 630 and the bank hole (BH).

Referring to FIG. 10, the display area DA of the display panel 110 according to the embodiments of the present disclosure may further include at least one shielding pattern 1000 disposed on the bank 630.

Since at least one shielding pattern 1000 is disposed on the bank 630, at least one shielding pattern 1000 may not overlap with the light emitting device ED, and may not overlap with an emission area formed by the light emitting device ED.

Referring to FIG. 10, in the display panel 110 according to the embodiments of the present disclosure, the first encapsulation layer 810 may be disposed on the shielding pattern 1000 and the common electrode CE in the display area DA, and on the shielding layer 800 and the common electrode CE in the non-display area NDA.

Referring to FIG. 10, in the display panel 110 according to the embodiments of the present disclosure, a second encapsulation layer 820 may be disposed to cover the first encapsulation layer 810, and a third encapsulation layer 830 may be disposed on the second encapsulation layer 820.

In the display area DA of the display panel 110 according to the embodiments of the present disclosure, at least one shielding pattern 1000 may be vertically overlapped with at least one signal line DL, RVL and VDDL, and at least one signal line DL, RVL and VDDL may be vertically overlapped with the bank 630.

A width W2 of each shielding pattern 1000 may be greater than or equal to a width of the area where at least one signal line overlapping with each shielding pattern 1000 is disposed.

According to the reliability structure configured in the display area DA of the display panel 110 according to the embodiments of the present disclosure, at least one signal line DL, RVL and VDDL, a bank 630, and at least one shielding pattern 1000 disposed in the display area DA may overlap in the vertical direction.

According to the reliability structure configured in the display area DA of the display panel 110 according to the embodiments of the present disclosure, in the display area DA, the common electrode CE may be not disposed on at least one shielding pattern 1000. That is, according to the reliability structure configured in the display area DA of the display panel 110 according to the embodiments of the present disclosure, in the display area DA, the common electrode CE may not overlap with at least one shielding pattern 1000, and the common electrode CE may not overlap with at least one signal line DL, RVL and VDDL.

According to the display panel 110 according to the embodiments of the present disclosure, the shielding pattern 1000 disposed in the display area DA may include the same material as the shielding layer 800 disposed in the non-display area NDA.

According to the display panel 110 according to the embodiments of the present disclosure, at least one signal line DL, RVL and VDDL overlapping with the shielding pattern 1000 disposed in the display area DA may include at least one of a data line DL, a reference voltage line RVL, and a first common driving voltage line VDDL.

According to the display panel 110 according to the embodiments of the present disclosure, if at least one signal line is a data line DL, a signal applied to at least one signal line may have a voltage that varies for each frame.

According to the display panel 110 according to the embodiments of the present disclosure, if at least one signal line is a reference voltage line RVL or a first common driving voltage line VDDL, a signal applied to at least one signal line may have a constant voltage for each frame.

Referring to FIG. 10, the display area DA of the display panel 110 according to the embodiments of the present disclosure may further include a color filter CF overlapping with the pixel electrode PE. The color filter CF may be disposed between the passivation layer 610 and the overcoat layer 620.

According to the reliability structure configured in the display area DA of the display panel 110 according to the embodiments of the present disclosure, in the display area DA, the common electrode CE may be disconnected by the shielding pattern 1000 within an area where the shielding pattern 1000 and the signal line DL, RVL or VDDL overlap.

According to the reliability structure configured in the display area DA of the display panel 110 according to the embodiments of the present disclosure, in the display area DA, the common electrode CE may not overlap with at least one shielding pattern 1000, and the common electrode CE may not overlap with at least one signal line DL, RVL or VDDL. Accordingly, there may be prevented an abnormal display driving operation and screen abnormality that may occur due to at least one signal line DL, RVL or VDDL overlapping with the common electrode CE.

According to the reliability structure configured in the display area DA of the display panel 110 according to the embodiments of the present disclosure, there may be eliminated unwanted parasitic capacitance between the signal line DL, RVL or VDDL and the common electrode CE in the display area DA. Accordingly, there may be significantly reduced the resistance-capacitance (RC) delay in the signal lines DL, RVL and VDDL.

Through the reduction of RC delay by the reliability structure configured in the display area DA of the display panel 110 according to the embodiments of the present disclosure, it is possible to implement high-speed driving for the display. In addition, through the reduction of RC delay by the reliability structure configured in the display area DA of the display panel 110 according to the embodiments of the present disclosure, there may be reduced the sensing time for sensing the characteristic value (for example, threshold voltage, mobility) of the driving transistor, etc.

In addition, by reducing RC delay by the reliability structure configured in the display area DA of the display panel 110 according to the embodiments of the present disclosure, the width of the signal line may be reduced. In this way, the aperture ratio of the display panel 110 may be improved by reducing the width of the signal line made of metal.

Hereinafter, it will be described a manufacturing method of the display device 100 according to the embodiments of the present disclosure with reference to FIGS. 11 to 19.

FIGS. 11 to 19 illustrate a manufacturing process of a display device 100 according to embodiments of the present disclosure.

Referring to FIGS. 11 to 16, the manufacturing method of the display device 100 according to embodiments of the present disclosure may include a transistor forming step (S10), a shielding layer forming step (S20), and a photoresist forming step (S30), a photoresist developing step (S40), a shielding layer developing step (S50), and an intermediate layer/common electrode/capping layer forming step (S60).

Figure 11:
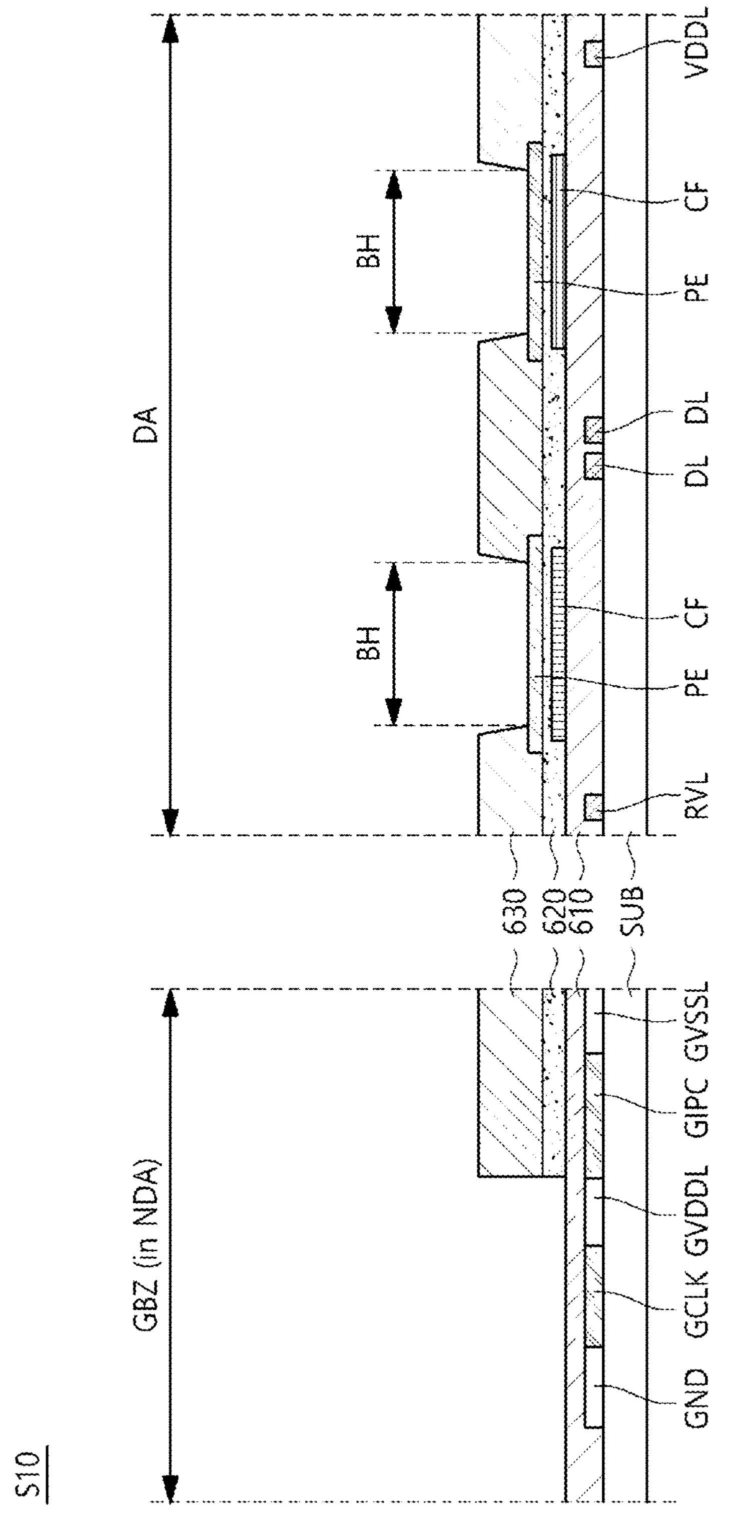
FIGS. 11 to 19 illustrate a manufacturing process of a display device according to embodiments of the present disclosure.

Referring to FIG. 11, in the transistor forming step (S10), a gate-in-panel circuit GIPC and a plurality of gate clock lines GCLKL may be formed on the substrate SUB in the non-display area NDA. Specifically, the plurality of gate clock lines GCLKL may be formed outside the gate-in-panel circuit GIPC, a passivation layer 610 may be formed on the gate-in-panel circuit GIPC and the plurality of gate clock lines GCLKL, and the insulating layers 620 and 630 may be formed on the passivation layer 610. Here, the insulating layer may include an overcoat layer 620 and a bank 630.

Referring to FIG. 11, in the transistor forming step (S10), in the display area DA, a plurality of signal lines DL, RVL and VDDL may be formed on the substrate SUB, a passivation layer 610 may be formed on the plurality of signal lines DL, RVL and VDDL, an overcoat layer 620 may be formed on the passivation layer 610, a pixel electrode PE may be formed on the overcoat layer 620, and a bank 630 having a bank hole BH overlapping with at least a portion of the pixel electrode PE may be formed.

Figure 12:
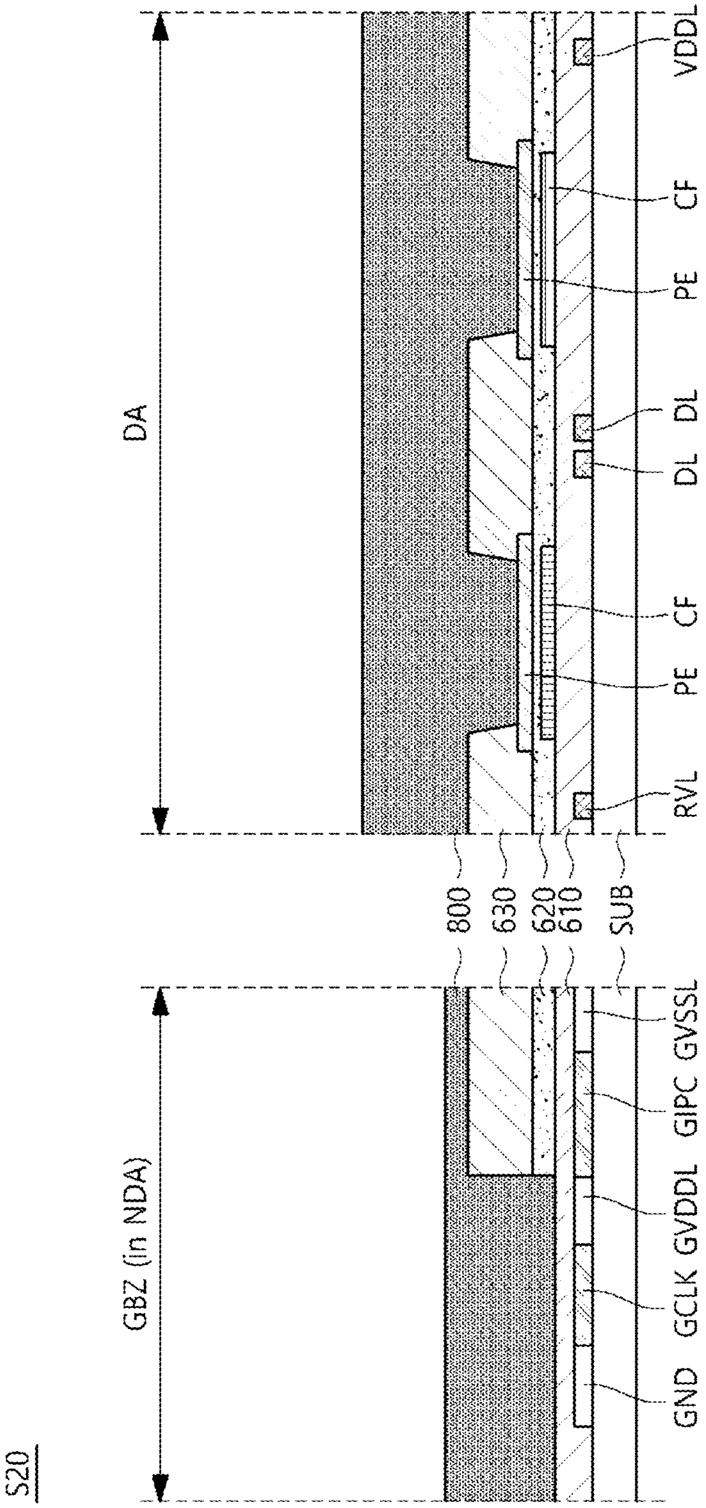

Referring to FIG. 12, in the shielding layer forming step (S20), the shielding layer 800 may be formed on the entire surface. That is, in the shielding layer forming step (S20), the shielding layer 800 may be formed in the display area DA and the non-display area NDA. For example, the shielding layer 800 may include a material which has blocking or trapping properties for moisture and oxygen.

The shielding layer 800 may include a non-metal having blocking or trapping properties for moisture and oxygen. For example, the shielding layer 800 may include a fluorine-based material.

The shielding layer 800 may include a metal having blocking or trapping properties for moisture and oxygen. For example, the shielding layer 800 may include at least one of barium, magnesium, cerium, lanthanum, and titanium.

The shielding layer 800 may include a non-metal having blocking or trapping properties for moisture and oxygen, and a metal having blocking or trapping properties for moisture and oxygen.

Figure 13:
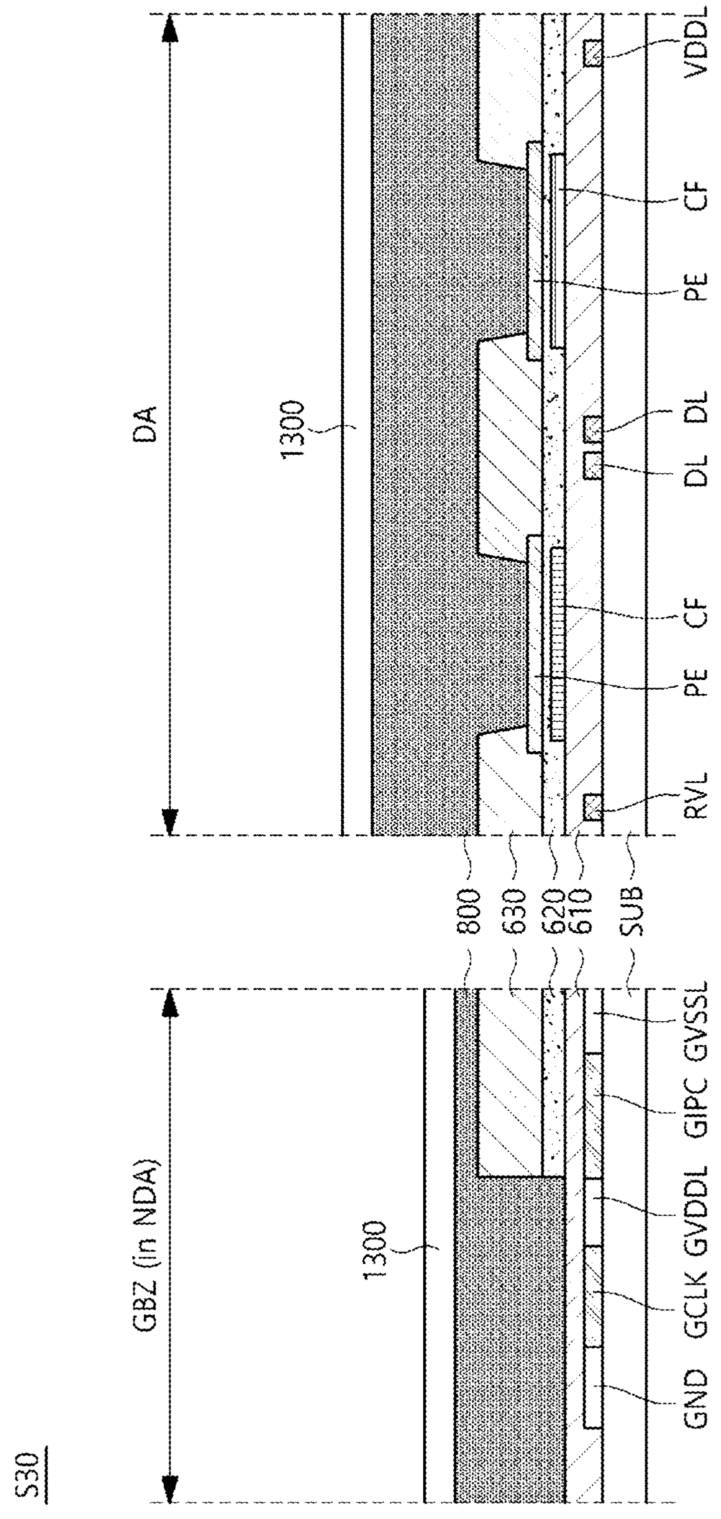

Referring to FIG. 13, in the photoresist forming step (S30), a photoresist 1300 may be formed on the shielding layer 800. The photoresist 1300 may be formed in both the display area DA and the non-display area NDA.

Figure 14:
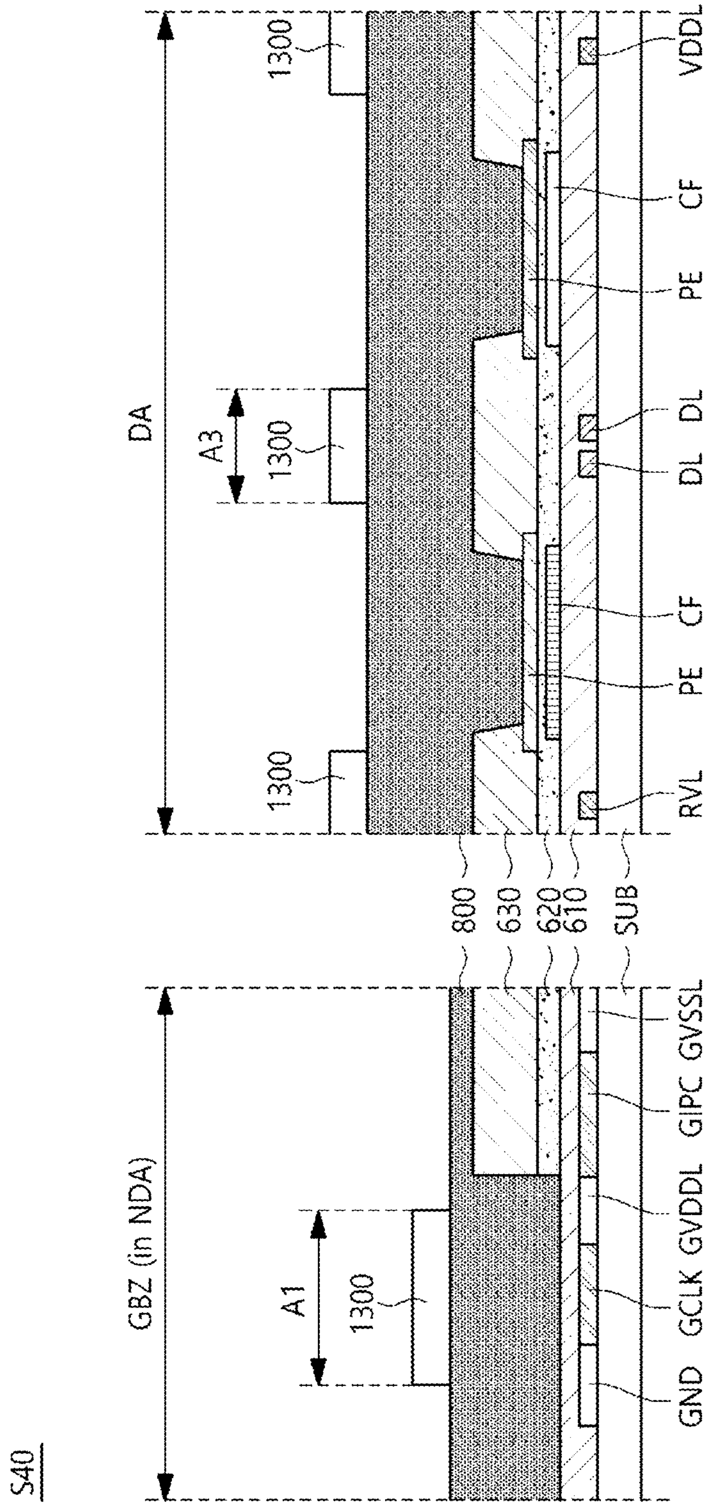

Referring to FIG. 14, in the photoresist developing step (S40), the photoresist 1300 may be developed, but the photoresist 1300 may be left or remained in a first area A1 in the non-display area NDA.

In the photoresist developing step (S40), the photoresist 1300 may be left or remained on each of a plurality of third areas A3 overlapping with a plurality of signal lines DL, RVL and VDDL within the display area DA.

Figure 15:
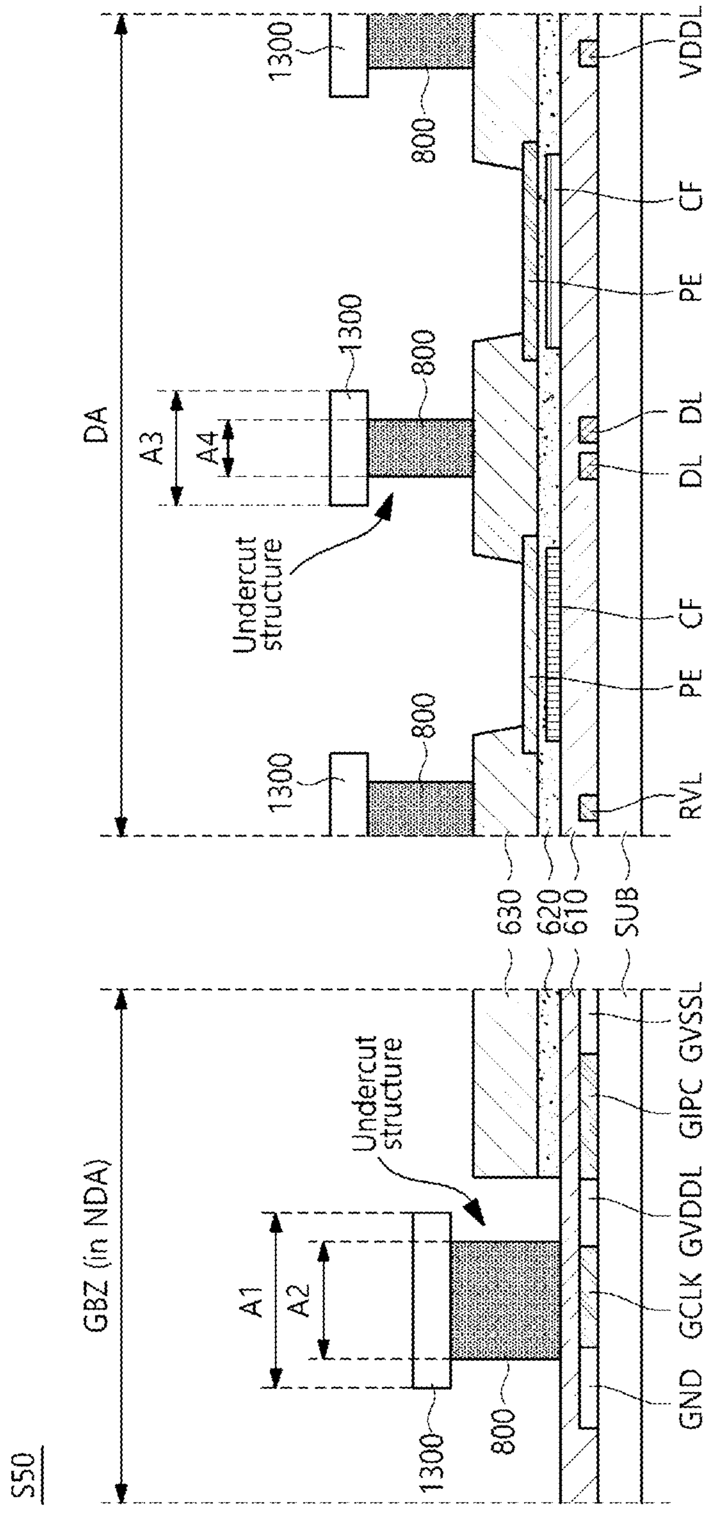

Referring to FIG. 15, in the shielding layer developing step (S50), the shielding layer 800 may be developed, but the shielding layer 800 may be left or remained in a second area A2 overlapping with the first area A1.

In the shielding layer developing step (S50), a shielding layer 800 may be left or remained in each of a plurality of fourth areas A4 overlapping with the plurality of third areas A3. The shielding layer 800 remained in the plurality of fourth areas A4 may overlap with a plurality of signal lines DL, RVL and VDDL.

Referring to FIG. 15, the second area A2 where the shielding layer 800 is left may have a size smaller than a size of the first area A1 where the photoresist is left. Accordingly, each of the plurality of fourth areas A4 where the shielding layer 800 remains may be smaller than each of the plurality of third areas A3 where the photoresist 1300 remains. Accordingly, there may be formed an undercut structure in which the side of the shielding layer 800 is sunken inward compared to the side of the photoresist 1300.

Referring to FIG. 15, the second area A2 where the shielding layer 800 is left may overlap with the area where the plurality of gate clock lines GCLKL are formed. The shielding layer 800 remained in the second area A2 may overlap with a plurality of gate clock lines GCLKL.

Figure 16:
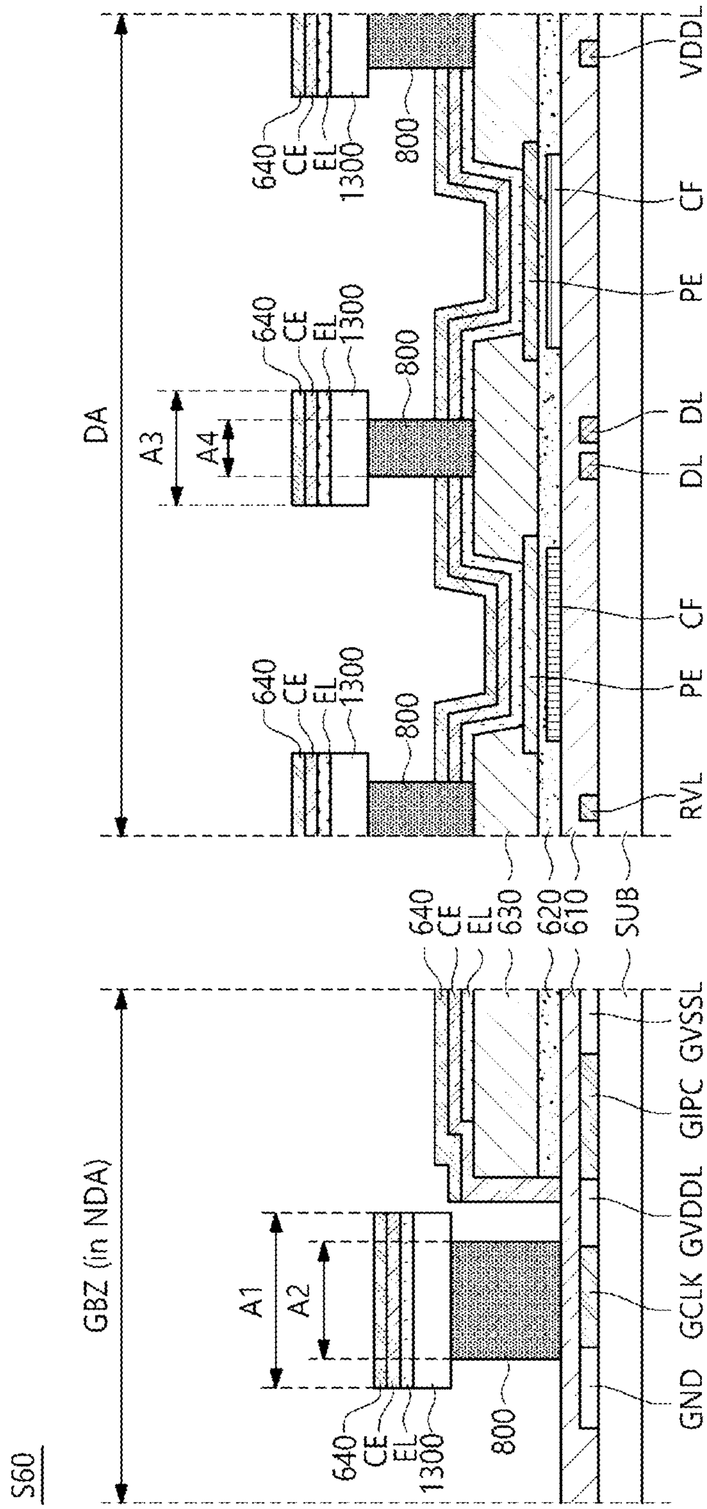

Referring to FIG. 16, in the intermediate layer/common electrode/capping layer forming step (S60), there may be deposited an intermediate layer EL included in the light emitting device ED on the photoresist 1300. Due to the undercut structure in which the shielding layer 800 under the photoresist 1300 is sunken, the intermediate layer EL may be disconnected in an area where an undercut structure is formed. That is, the intermediate layer EL may be formed in a disconnected state around the photoresist 1300 remaining in the first area A1 and a plurality of third areas A3.

Referring to FIG. 16, in the intermediate layer/common electrode/capping layer forming step (S60), the common electrode CE may be deposited. At this time, due to the undercut structure in which the shielding layer 800 under the photoresist 1300 is sunken, the common electrode CE may be disconnected in the area where the undercut structure is formed. That is, the common electrode CE may be formed in a disconnected state around the photoresist 1300 remaining in the first area A1 and the plurality of third areas A3.

The common electrode CE disposed on the shielding layer 800 and the photoresist 1300 and the common electrode CE surrounding it may be separated from each other.

That is, in the intermediate layer/common electrode/capping layer forming step (S60), the common electrode CE may be deposited in a disconnected state between the photoresist 1300 remaining only in the first area A1 and the insulating layers 620 and 630.

Referring to FIG. 16, in the intermediate layer/common electrode/capping layer forming step (S60), the capping layer 640 may be deposited. At this time, due to the undercut structure in which the shielding layer 800 under the photoresist 1300 is depressed or sunken, the capping layer 640 may be disconnected in the area where the undercut structure is formed. That is, the capping layer 640 disposed on the shielding layer 800 and the capping layer 640 disposed in the display area DA may be separated from each other.

Figure 17:
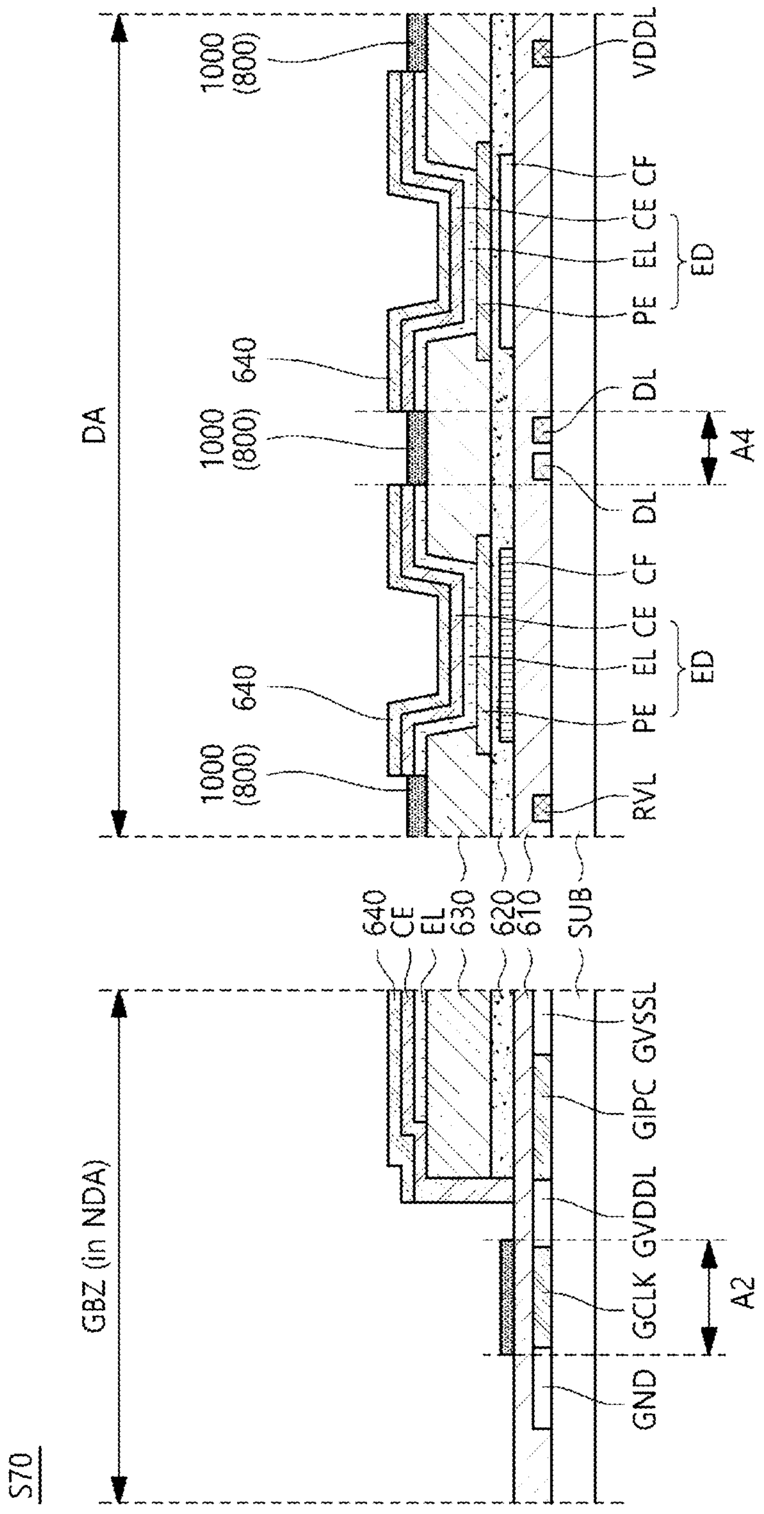
Figure 18:
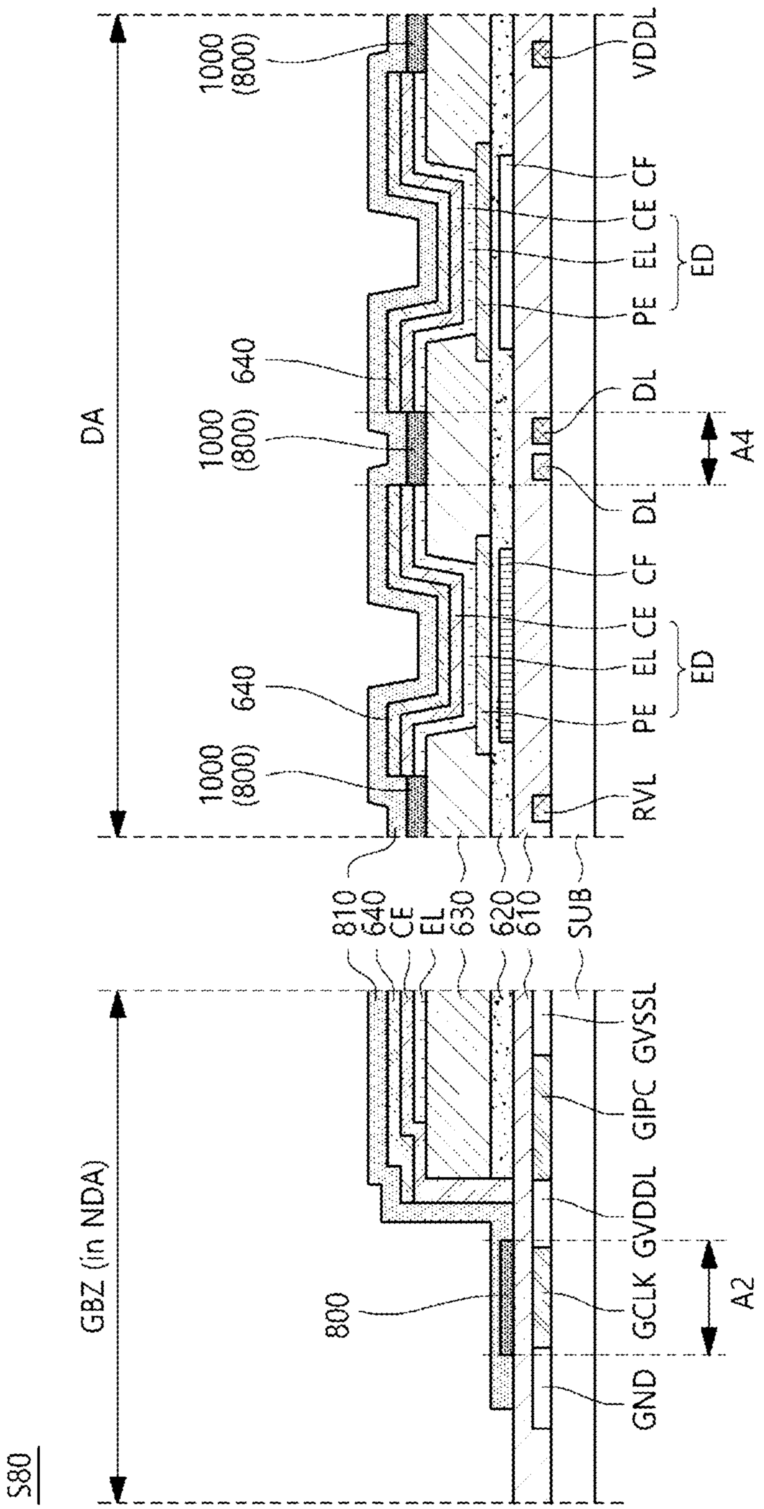
Figure 19:
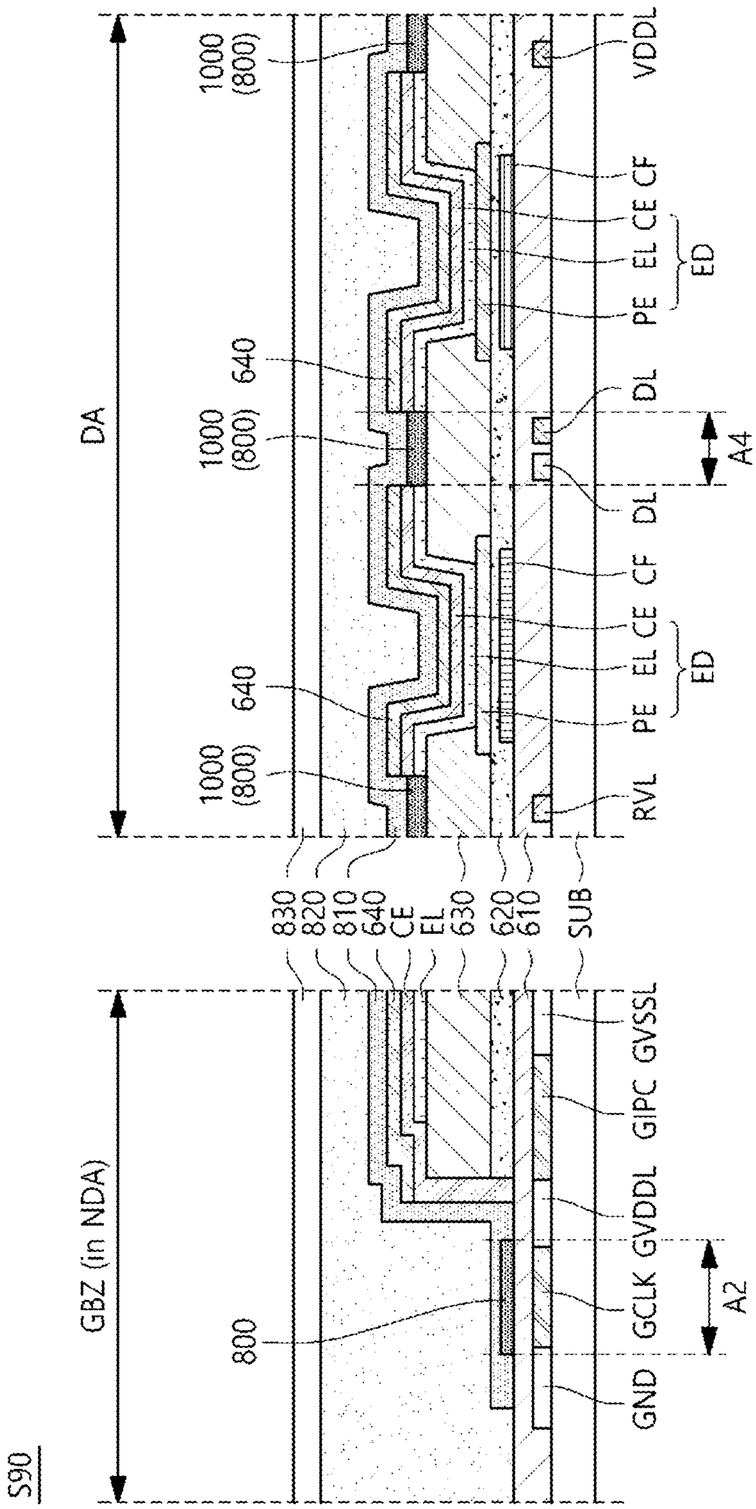

Referring to FIGS. 17 to 19, the manufacturing method of the display device 100 according to embodiments of the present disclosure may further include an upper shielding layer removing step (S70) and an encapsulation layer forming step (S80, S90).

Referring to FIG. 17, in the upper shielding layer removing step (S70), The photoresist 1300 remaining in the first area A1 and the plurality of third areas A3 may be removed, and the common electrode CE disposed on the photoresist 1300 remaining in the first area A1 and the plurality of third areas A3 may be removed. At this time, the upper layer of the shielding layer 800 may also be removed by a certain thickness. The shielding layer 800 formed in the display area DA may also be referred to as a shielding pattern 1000.

After the upper shielding layer removing step (S70), a portion of the common electrode CE overlapping with a plurality of gate clock lines GCLKL may be removed, and a portion of the common electrode CE overlapping with a plurality of signal lines DL, RVL and VDDL may be removed.

Referring to FIG. 18, in the encapsulation layer forming step (S80), the first encapsulation layer 810 may be formed. For example, the first encapsulation layer 810 may include an inorganic layer, and in some cases, may include an organic layer.

Referring to FIG. 18, the first encapsulation layer 810 may be disposed on the shielding layer 800 and the common electrode CE.

In the non-display area NDA, the first encapsulation layer 810 may be interposed between the shielding layer 800 and the common electrode CE. Accordingly, the shielding layer 800 and the common electrode CE may be separated from each other by the first encapsulation layer 810.

In the display area (DA), the first encapsulation layer 810 may be interposed between the disconnected spaces of the common electrodes CE. Accordingly, the common electrodes CE may be separated from each other by the first encapsulation layer (810).

Referring to FIG. 19, in a second and third encapsulation layer forming step (S90), the second encapsulation layer 820 may be formed to cover the first encapsulation layer 810, and a third encapsulation layer 830 may be formed on the second encapsulation layer 820.

For example, the first encapsulation layer 810 may be an inorganic film. The second encapsulation layer 820 may include an adhesive layer, and may further include a moisture absorbent. The third encapsulation layer 830 may be a metal thin film.

Embodiments of the present disclosure described above are briefly described as follows.

A display device according to embodiments of the present disclosure may include a substrate divided into a display area and a non-display area, a gate driving circuit disposed on the substrate and disposed in the non-display area, a plurality of gate clock lines disposed on the substrate and disposed outside the gate driving circuit, a passivation layer disposed on the gate driving circuit and the plurality of gate clock lines, a common electrode disposed on the passivation layer and not overlapping with the plurality of gate clock lines, and a shielding layer located in the non-display area, disposed on the passivation layer, and overlapping with the plurality of gate clock lines. A common electrode disposed on the passivation layer, disposed inside the shielding layer, and spaced apart from the shielding layer in a lateral direction.

The display device according to embodiments of the present disclosure may further include a first encapsulation layer disposed on the shielding layer and the common electrode and interposed between the shielding layer and the common electrode.

The shielding layer and the common electrode may be separated from each other by the first encapsulation layer.

The first encapsulation layer may cover both an upper surface and a side surface of the shielding layer.

The display device according to embodiments of the present disclosure may further include a capping layer disposed between a portion of the common electrode and a portion of the first encapsulation layer.

The display device according to embodiments of the present disclosure may further include an overcoat layer disposed on the passivation layer.

The common electrode may be disposed on the overcoat layer, and may extend to be disposed on an outer side surface of the overcoat layer.

The display device according to embodiments of the present disclosure may further include an intermediate common layer which is part of the layers for configuring a light emitting device in the display area and includes at least one organic film extending from the display area to a portion of the non-display area.

The intermediate common layer may overlap with at least a portion of the gate driving circuit.

The display device according to embodiments of the present disclosure may further include at least one first gate voltage line disposed between the gate driving circuit and the plurality of gate clock lines, and configured to transfer a first gate voltage to the gate driving circuit, and at least one second gate voltage line disposed between the gate driving circuit and the display area, and configured to transfer a second gate voltage different from the first gate voltage to the gate driving circuit.

The common electrode may not overlap with the at least one first gate voltage line, but may overlap with the at least one second gate voltage line.

The display device according to embodiments of the present disclosure may further include a ground line disposed further outside the plurality of gate clock lines.

In the display device according to embodiments of the present disclosure, the shielding layer may include a non-metal having a blocking or trapping property for moisture and oxygen. For example, the shielding layer may include a fluorine-based material.

In the display device according to embodiments of the present disclosure, the shielding layer may be spaced apart from the common electrode, and may not overlap with the common electrode in a vertical direction.

In the display device according to embodiments of the present disclosure, the shielding layer may include a metal having a blocking or trapping property for moisture and oxygen. For example, the shielding layer may include at least one of barium, magnesium, cerium, lanthanum, and titanium.

A display device according to embodiments of the present disclosure may further include at least one signal line disposed on the substrate, a pixel electrode disposed on a passivation layer, a bank disposed on the pixel electrode and having a bank hole overlapping with a portion of the pixel electrode, an intermediate layer disposed between the pixel electrode and the common electrode in the bank hole, at least one shielding pattern disposed on the bank, and a first encapsulation layer disposed on the at least one shielding pattern and the common electrode.

The common electrode may be not disposed on the at least one shielding pattern, and the at least one shielding pattern may overlap with the at least one signal line in a vertical direction.

The shielding pattern may include the same material as the shielding layer. For example, the shielding pattern and the shielding layer may be formed during a process by being deposited together. Accordingly, the shielding pattern may also be referred to as a shielding layer.

The common electrode may be disconnected by the shielding pattern within an area where at least one shielding pattern and at least one signal line overlap. That is, the common electrode may not exist within the area where at least one shielding pattern and at least one signal wire overlap.

A display device according to embodiments of the present disclosure may include a substrate having a display area and a non-display area, at least one signal line disposed on the substrate and disposed in the non-display area, an overcoat layer disposed on at least one signal line, a pixel electrode disposed on the overcoat layer, a bank having a bank hole overlapping with at least a portion of the pixel electrode, a common electrode disposed on the bank and extending inside the bank hole, and a shielding pattern disposed on the bank.

According to embodiments of the present disclosure, the common electrode may be disconnected by the shielding pattern, and the shielding pattern may overlap with at least one signal line. At least one signal line may not overlap with the common electrode.

A method of manufacturing a display device according to embodiments of the present disclosure may include a first step of forming, in a non-display area around a display area, a gate driving circuit and a plurality of gate clock lines on a substrate, forming the plurality of gate clock lines outside the gate driving circuit, forming a passivation layer on the gate driving circuit and the plurality of gate clock lines, and forming an overcoat layer and a bank on the passivation layer, a second step of forming a shielding layer in the display area and the non-display area, a third step of forming a photoresist on the shielding layer, a fourth step of developing the photoresist and remaining the photoresist in a first area in the non-display area, a fifth step of developing the shielding layer and remaining the shielding layer in a second area overlapping with the first area, and a sixth step of depositing a common electrode.

The shielding layer remaining in the second area in the fifth step may overlaps with the plurality of gate clock lines.

In the first step, at least one signal line may be formed on the substrate in the display area, a passivation layer may be formed on the plurality of signal lines, an overcoat layer may be formed on the passivation layer, a pixel electrode may be formed on the overcoat layer in the display area, and a bank having a bank hole overlapping with at least a portion of the pixel electrode may be formed.

In the fourth step, a photoresist may be left or remained in a plurality of third areas overlapping with the plurality of signal lines in the display area.

In the fifth step, a shielding layer may be left or remained in a plurality of fourth areas overlapping with the plurality of third areas. The shielding layer remained in the plurality of fourth areas may overlap with the plurality of signal lines.

The second area may overlap with the first area and may be smaller than the first area. Each of the plurality of fourth areas may be smaller than each of the plurality of third areas.

In the sixth step, the common electrode may be formed in a disconnected state around the photoresist remaining in the first area and the plurality of third areas.

The method of manufacturing a display device according to embodiments of the present disclosure may further include, after the sixth step, a seventh step of removing the photoresist remaining in the first area and the plurality of third areas, and removing the common electrode disposed on the photoresist remaining in the first area and the plurality of third areas.

After the seventh step, the common electrode in a part overlapping with the plurality of gate clock lines may be removed, and a portion of the common electrode overlapping with the plurality of signal lines may be removed. Accordingly, the common electrode may remain only in a portion that does not overlap with the plurality of gate clock lines and a portion that does not overlap with the plurality of signal lines.

The method of manufacturing a display device according to embodiments of the present disclosure may further include, an eighth step of forming a first encapsulation layer after the seventh step.

The first encapsulation layer may be disposed on the shielding layer and the common electrode, and may include an inorganic layer.

In the non-display area, the first encapsulation layer may be interposed between the shielding layer and the common electrode, so that the shielding layer and the common electrode may be separated from each other by the first encapsulation layer.

In the display area, the first encapsulation layer may be interposed between the disconnected spaces of the common electrodes, so that the common electrodes may be separated from each other by the first encapsulation layer.

For example, the shielding layer may include a material having a blocking or trapping property for moisture and oxygen. As an example, the shielding layer may include a metal having blocking or trapping properties for moisture and oxygen. As another example, the shielding layer may include a non-metal having blocking or trapping properties for moisture and oxygen.

According to the embodiments of the present disclosure described above, there may be provided a display device having a reliability structure capable of preventing abnormal operation of a gate driving circuit which may occur in a display panel with a built-in gate driving circuit, and a method of manufacturing the same.

According to embodiments of the present disclosure, there may be provided a display device with a reliability structure capable of preventing the display abnormalities which may occur in a display panel with a built-in gate driving circuit, and a method of manufacturing the same.

According to embodiments of the present disclosure, there may be provided a display device with a reliability structure capable of preventing an output deviation of gate signals in the gate driving circuit, and a method of manufacturing the same.

According to embodiments of the present disclosure, there may be provided a display device with a reliability structure capable of preventing the load deviation between gate clock lines input to the gate driving circuit, and a method of manufacturing the same.

According to embodiments of the present disclosure, there may be provided a display device with a reliability structure capable of preventing a burnt defect in at least one gate clock line which may occur in a display panel with a built-in gate driving circuit, and a method of manufacturing the same.

According to embodiments of the present disclosure, it is possible to reduce the weight of the display device by implementing a narrow bezel structure.

The above description and the accompanying drawings provide an example of the technical idea of the present disclosure for illustrative purposes only. Various modifications, additions and substitutions to the described embodiments will be readily apparent to those skilled in the art without departing from the spirit and scope of the present disclosure. In addition, the disclosed embodiments are intended to illustrate the scope of the technical idea of the present disclosure. Thus, the scope of the present disclosure is not limited to the embodiments shown.

What is claimed is:

1. A display device comprising:
a substrate divided into a display area and a non-display area;
a gate driving circuit on the substrate and in the non-display area;
a plurality of gate clock lines on the substrate, the plurality of gate clock lines outside the gate driving circuit;
a passivation layer on the gate driving circuit and the plurality of gate clock lines;
a common electrode on the passivation layer and non-overlapping with the plurality of gate clock lines;
a shielding layer located in the non-display area, on the passivation layer, and overlapping with the plurality of gate clock lines; and
a first encapsulation layer on the shielding layer and the common electrode, the first encapsulation layer interposed between the shielding layer and the common electrode,
wherein the shielding layer and the common electrode are separated from each other by the first encapsulation layer.

2. The display device of claim 1, wherein the first encapsulation layer covers both an upper surface and a side surface of the shielding layer.

3. The display device of claim 1, further comprising:
a capping layer between a portion of the common electrode and a portion of the first encapsulation layer.

4. The display device of claim 1, further comprising:
an overcoat layer on the passivation layer,
wherein the common electrode is on the overcoat layer and extends on an outer side surface of the overcoat layer.

5. The display device of claim 1, further comprising:
an intermediate common layer which is part of layers that configure a light emitting device in the display area and includes at least one organic film extending from the display area to a portion of the non-display area,
wherein the intermediate common layer overlaps with at least a portion of the gate driving circuit.

6. The display device of claim 1, further comprising:
at least one first gate voltage line between the gate driving circuit and the plurality of gate clock lines, the at least one first gate voltage line transferring a first gate voltage to the gate driving circuit; and
at least one second gate voltage line between the gate driving circuit and the display area, the at least one second gate voltage line transferring a second gate voltage that is different from the first gate voltage to the gate driving circuit.

7. The display device of claim 6, wherein the common electrode is non-overlapping with the at least one first gate voltage line and overlaps with the at least one second gate voltage line.

8. The display device of claim 1, further comprising:
a ground line disposed further outside the plurality of gate clock lines.

9. The display device of claim 1, wherein the shielding layer is spaced apart from the common electrode and is non-overlapping with the common electrode in a vertical direction.

10. The display device of claim 1, further comprising:
at least one signal line on the substrate;
a pixel electrode on the passivation layer;
a bank on the pixel electrode, the bank having a bank hole overlapping with a portion of the pixel electrode;
an intermediate layer between the pixel electrode and the common electrode in the bank hole; and
at least one shielding pattern on the bank;
wherein the common electrode is not on the at least one shielding pattern, and
wherein the at least one shielding pattern overlaps with the at least one signal line in a vertical direction.

11. The display device of claim 10, wherein the at least one shielding pattern includes a same material as the shielding layer.

12. The display device of claim 10, wherein in an area where at least one shielding pattern and at least one signal line overlap, the common electrode is disconnected by the at least one shielding pattern.

13. The display device of claim 1, wherein the plurality of gate clock lines are configured to supply gate clock signals needed for an operation of the gate driving circuit to the gate driving circuit, and
wherein the plurality of gate clock lines are different from both at least one first gate voltage line for supplying a first gate voltage to the gate driving circuit and at least one second gate voltage line for supplying a second gate voltage to the gate driving circuit.

14. A display device comprising:
a substrate including a display area and a non-display area;
at least one signal line on the substrate and in the display area;
an overcoat layer on the at least one signal line;
a pixel electrode on the overcoat layer;
a bank having a bank hole overlapping with at least a portion of the pixel electrode;
a common electrode on the bank and extending inside the bank hole; and a shielding pattern on the bank, wherein the common electrode is disconnected by the shielding pattern, and the shielding pattern overlaps with at least one signal line.

* * * * *